(12) United States Patent
Ogura et al.

(10) Patent No.: US 8,174,600 B2
(45) Date of Patent: May 8, 2012

(54) IMAGE SENSING APPARATUS AND IMAGING SYSTEM

(75) Inventors: Masanori Ogura, Kawasaki (JP); Toru Koizumi, Yokohama (JP); Shin Kikuchi, Isehara (JP); Tatsuya Ryoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 12/484,310

(22) Filed: Jun. 15, 2009

(65) Prior Publication Data

US 2010/0002114 A1 Jan. 7, 2010

(30) Foreign Application Priority Data

Jul. 7, 2008 (JP) ................................. 2008-177408

(51) Int. Cl.
*H04N 5/335* (2011.01)
(52) U.S. Cl. ....................................... 348/301; 348/308
(58) Field of Classification Search .................. 348/301, 348/308, 294
See application file for complete search history.

(56) References Cited

U.S. PATENT DOCUMENTS

| | | | | |
|---|---|---|---|---|
| 5,068,738 A | * | 11/1991 | Miida | 348/345 |
| 5,140,426 A | * | 8/1992 | Oda | 348/249 |
| 6,670,990 B1 | | 12/2003 | Kochi et al. | 348/310 |
| 6,762,398 B1 | * | 7/2004 | Tanaka | 250/208.1 |
| 6,798,453 B1 | * | 9/2004 | Kaifu | 348/304 |
| 6,960,751 B2 | * | 11/2005 | Hiyama et al. | 250/208.1 |
| 7,110,030 B1 | | 9/2006 | Kochi et al. | 348/308 |
| 7,227,208 B2 | | 6/2007 | Ogura et al. | 257/292 |
| 7,321,110 B2 | | 1/2008 | Okita et al. | 250/208.1 |
| 7,324,144 B1 | | 1/2008 | Koizumi | 348/294 |
| 7,388,608 B2 | * | 6/2008 | Beck et al. | 348/243 |
| 7,429,764 B2 | | 9/2008 | Koizumi et al. | 257/292 |
| 7,456,888 B2 | | 11/2008 | Kikuchi et al. | 348/308 |
| 7,466,003 B2 | | 12/2008 | Ueno et al. | 257/462 |
| 7,538,810 B2 | | 5/2009 | Koizumi et al. | 348/308 |
| 7,550,793 B2 | | 6/2009 | Itano et al. | 257/239 |
| 7,554,591 B2 | | 6/2009 | Kikuchi et al. | 348/308 |
| 7,948,530 B2 | * | 5/2011 | Okuyama | 348/241 |
| 2004/0165092 A1 | * | 8/2004 | Tanaka et al. | 348/308 |
| 2006/0157759 A1 | | 7/2006 | Okita et al. | 257/292 |
| 2007/0052831 A1 | | 3/2007 | Ogura et al. | 348/308 |
| 2008/0024630 A1 | | 1/2008 | Hiyama et al. | 348/241 |
| 2008/0036891 A1 | | 2/2008 | Ono et al. | 348/308 |

(Continued)

FOREIGN PATENT DOCUMENTS

JP    11-150255 A    6/1999

(Continued)

*Primary Examiner* — Lin Ye
*Assistant Examiner* — Amy Hsu
(74) *Attorney, Agent, or Firm* — Fitzpatrick, Cella, Harper & Scinto

(57) ABSTRACT

An image sensing apparatus comprises a transfer block including a first transfer unit and a second transfer unit, wherein the first transfer unit includes a first impedance converter which transfers a first signal to the output unit, and the first transfer unit transfers, as a third signal, a difference signal between a first offset of the first impedance converter and a signal obtained by superimposing the first offset on the first signal, the second transfer unit includes a second impedance converter which transfers a second signal to the output unit, and the second transfer unit transfers, as a fourth signal, a difference signal between a second offset of the second impedance converter and a signal obtained by superimposing the second offset on the second signal, and the output unit calculates a difference between the third signal and the fourth signal, generating and outputting an image signal.

9 Claims, 24 Drawing Sheets

U.S. PATENT DOCUMENTS

| | | | |
|---|---|---|---|
| 2008/0062294 A1 | 3/2008 | Koizumi et al. | 348/300 |
| 2008/0062295 A1 | 3/2008 | Fujimura et al. | 348/301 |
| 2008/0062296 A1 | 3/2008 | Ogura et al. | 348/308 |
| 2009/0073298 A1 | 3/2009 | Ogura et al. | 348/308 |
| 2009/0159783 A1 | 6/2009 | Koizumi et al. | 250/208.1 |
| 2009/0207293 A1 | 8/2009 | Ryoki et al. | 348/308 |
| 2009/0219429 A1 | 9/2009 | Ogura et al. | 348/308 |

FOREIGN PATENT DOCUMENTS

| | | |
|---|---|---|
| JP | 2003-051989 A | 2/2003 |

\* cited by examiner

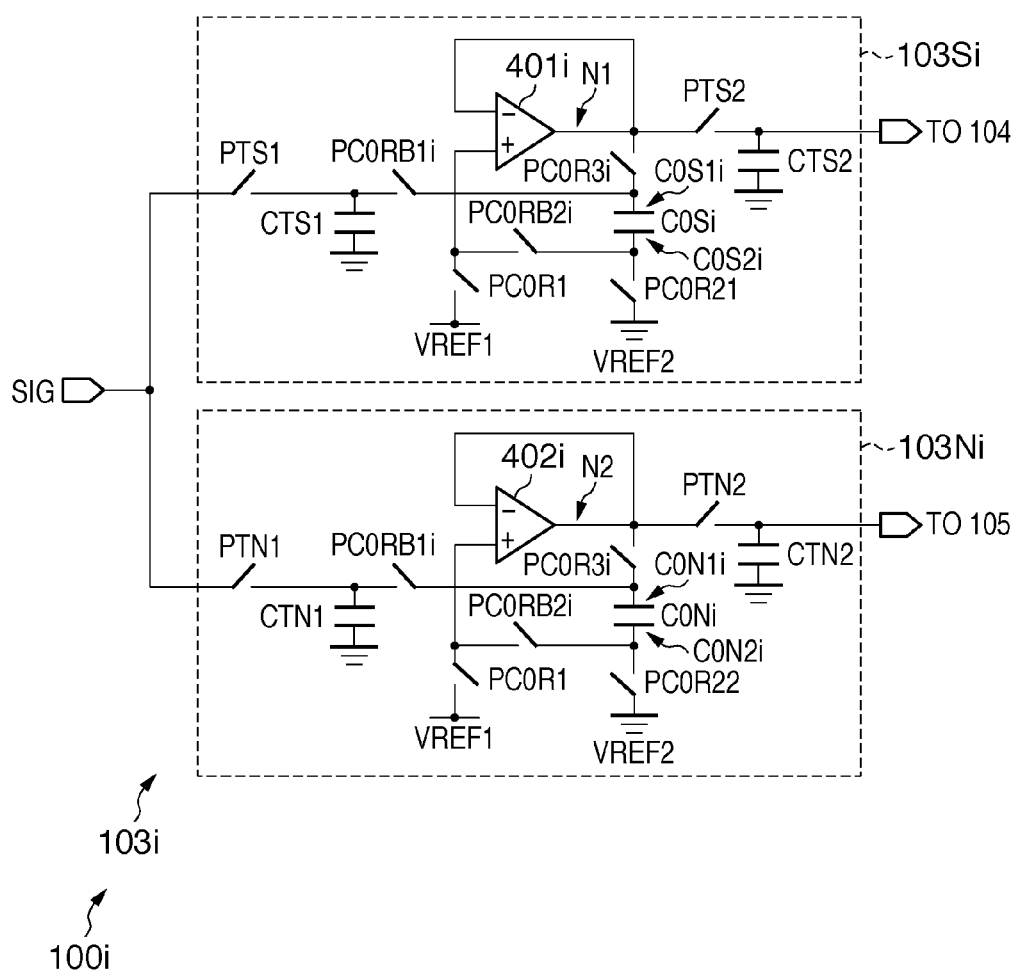
F I G. 6

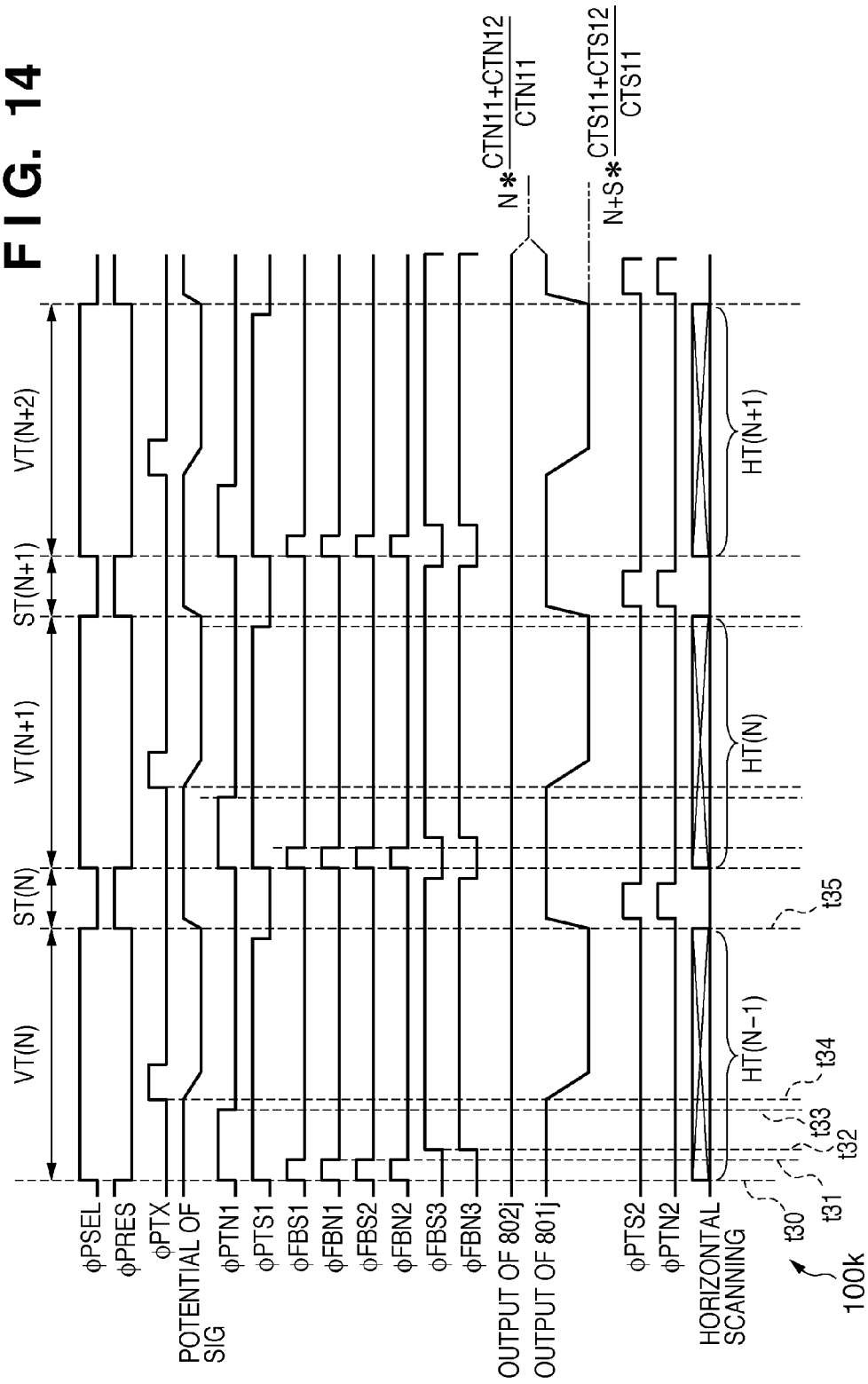

FIG. 26

| FIGURE | TIMING | NON-INVERTING INPUT TERMINAL | OUTPUT TERMINAL |
|---|---|---|---|
| FIG. 21 | 1701 BETWEEN t50 AND t51 | VREF | VREF+Vof1 |
| | 1702 BETWEEN t52 AND t53 | VREF | VREF+Vof2 |
| FIG. 22 | 1701 BETWEEN t54 AND t55 | VREF−(VREF+Vof1−Vs) | VREF−(VREF+Vof1−Vs)+Vof1=Vs |
| | 1702 BETWEEN t54 AND t55 | VREF−(VREF+Vof2−Vn) | VREF−(VREF+Vof2−Vn)+Vof2=Vn |

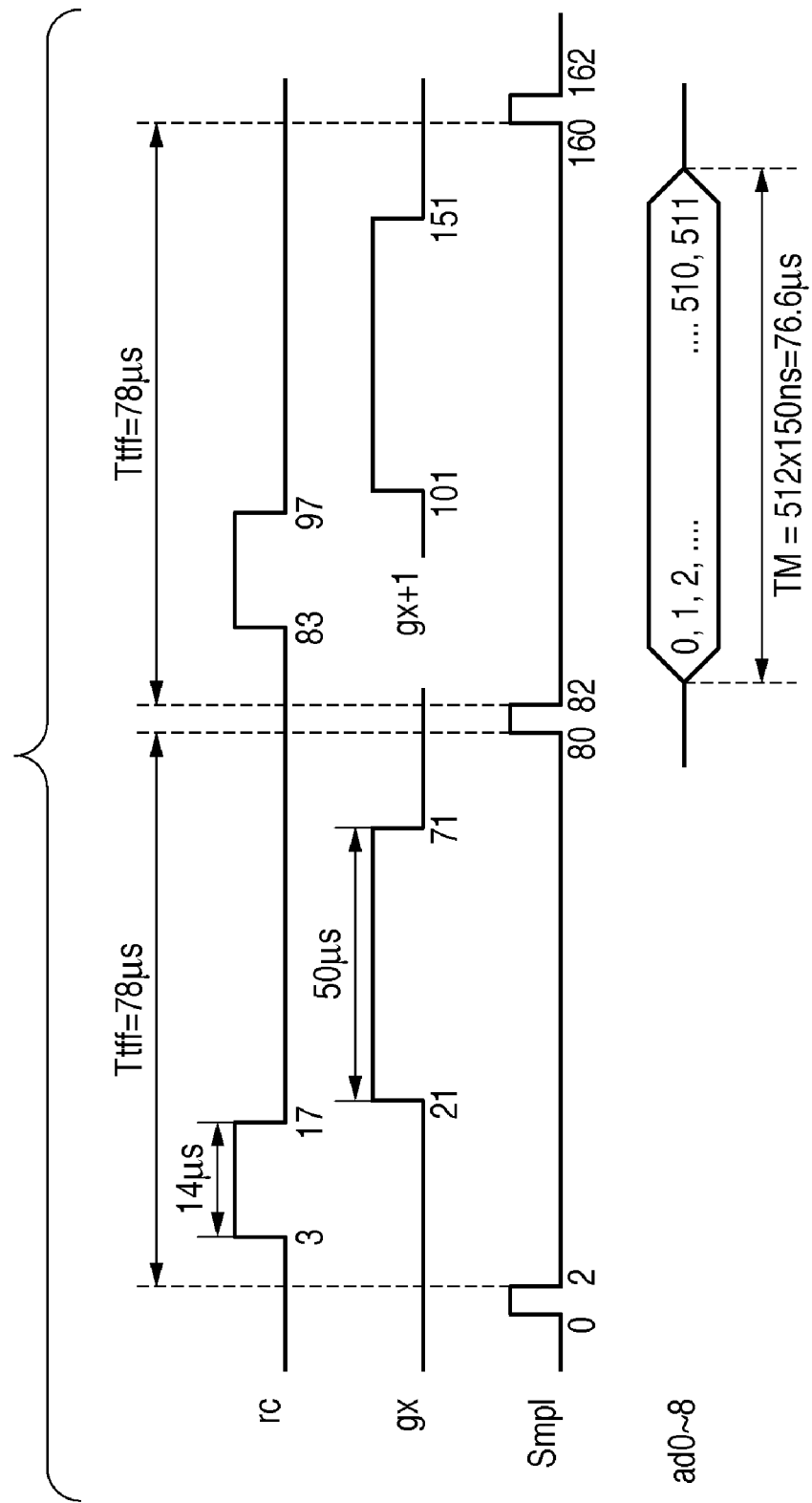

US 8,174,600 B2

IMAGE SENSING APPARATUS AND IMAGING SYSTEM

BACKGROUND OF THE INVENTION

1. Field of the Invention

The present invention relates to an image sensing apparatus and imaging system.

2. Description of the Related Art

In an image sensing apparatus disclosed in Japanese Patent Laid-Open No. 11-150255, a capacitance C, amplifier 2, switch SW, capacitance Csh, and amplifier 5 are connected, in the order named, to a signal line SIG, which is connected to pixels on each column in a pixel array, as shown in FIG. 28. In this image sensing apparatus, a reset switch 1 resets the capacitance C in accordance with a reset signal "rc", as shown in FIG. 29. Then, a thin-film transistor T is turned on, in accordance with a transfer signal "gx", to transfer the signal of a photoelectric conversion element S to the capacitance C, and the signal is stored in the capacitance C. After that, when the switch SW is turned on in response to a pulse "smpl", the amplifier 2 amplifies the signal stored in the capacitance C. The amplified signal is transferred to the capacitance Csh in a sample-and-hold circuit 3, and stored in it. After the switch SW is turned off, the signal stored in the capacitance Csh is transferred to an A/D converter 7 when an analog multiplexer 4 selects terminal 4 in accordance with pulses ad0 to ad8. The A/D converter 7 A/D-converts the received signal and outputs the converted signal to Dout. This arrangement can prevent the adverse effect of fluctuations of an analog voltage output from the amplifier 2 on a signal stored in the capacitance Csh while the switch SW is OFF. According to Japanese Patent Laid-Open No. 11-150255, the apparatus can easily improve the S/N ratio.

In an image sensing apparatus disclosed in Japanese Patent Laid-Open No. 2003-51989, a noise signal and optical signal are read out from a pixel to an output amplifier at different timings. The output amplifier performs CDS processing to output the difference between the optical and noise signals. According to Japanese Patent Laid-Open No. 2003-51989, the image sensing apparatus can output an image signal free from fixed pattern noise.

Image sensing apparatuses have been required to perform the readout operation of a signal from a pixel to an output amplifier at higher speed, and to output an image signal generated in accordance with a signal read out from a pixel with lower noise contained in it. It is generally difficult to meet both of these two requirements.

SUMMARY OF THE INVENTION

The present invention provides for speeding up the readout operation of a signal from a pixel to an output amplifier, and for reducing fixed pattern noise contained in an image signal.

According to the first aspect of the present invention, there is provided an image sensing apparatus comprising: a plurality of pixels each including a photoelectric conversion unit; a signal line connected to the plurality of pixels; an output unit; and a transfer block which transfers, to the output unit, a first signal and a second signal that are output from a readout pixel to the signal line at different timings while the readout pixel among the plurality of pixels is selected, wherein the transfer block includes a first transfer unit and a second transfer unit, the first transfer unit includes a first impedance converter which transfers the first signal to the output unit, and the first transfer unit transfers, as a third signal, a difference signal between a first offset of the first impedance converter and a signal obtained by superimposing the first offset on the first signal to the output unit, the second transfer unit includes a second impedance converter which transfers the second signal to the output unit, and the second transfer unit transfers, as a fourth signal, a difference signal between a second offset of the second impedance converter and a signal obtained by superimposing the second offset on the second signal to the output unit, and the output unit calculates a difference between the third signal and the fourth signal, generating and outputting an image signal.

According to the second aspect of the present invention, there is provided an imaging system comprising: an image sensing apparatus according to the first aspect of the present invention; an optical system which forms an image on an image sensing surface of the image sensing apparatus; and a signal processing unit which processes a signal output from the image sensing apparatus to generate image data.

The present invention can speed up the readout operation of a signal from a pixel to an output amplifier, and reduce fixed pattern noise contained in an image signal.

Further features of the present invention will become apparent from the following description of exemplary embodiments with reference to the attached drawings.

BRIEF DESCRIPTION OF THE DRAWINGS

FIG. 6 is a circuit diagram showing the structure of a readout circuit 103$i$ on each column in an image sensing apparatus 100$i$ according to the second embodiment of the present invention;

FIG. 14 is a timing chart showing the operation of a readout circuit 103$j$ on each column in an image sensing apparatus 100$k$ according to the fourth embodiment of the present invention;

FIG. 26 is a table showing signals at the input and output terminals of the impedance converter;

FIG. 29 is a circuit diagram for explaining the prior art.

DESCRIPTION OF THE EMBODIMENTS

Figure 27:
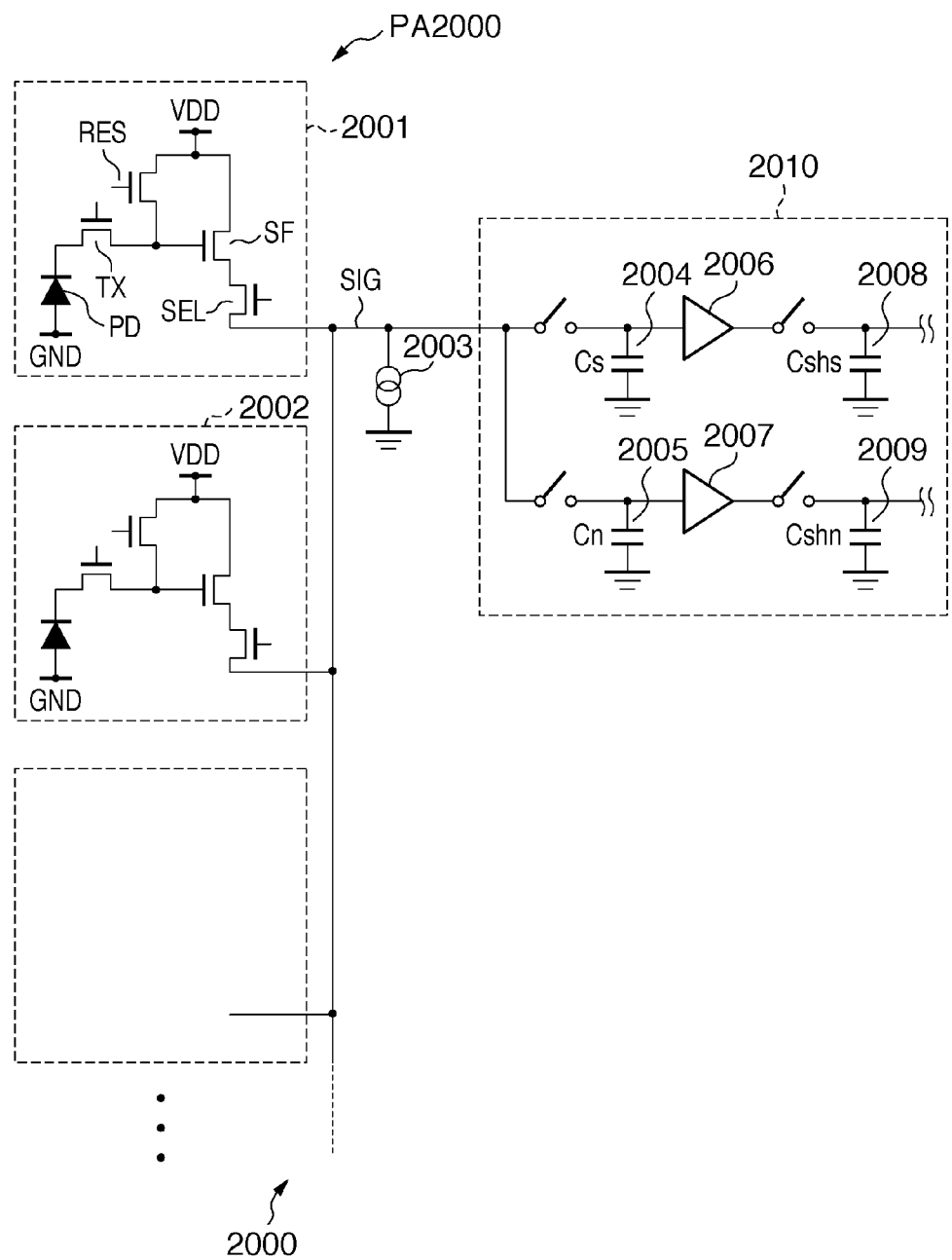
FIG. 27 is a circuit diagram for explaining a problem to be solved by the present invention.
Figure 28:
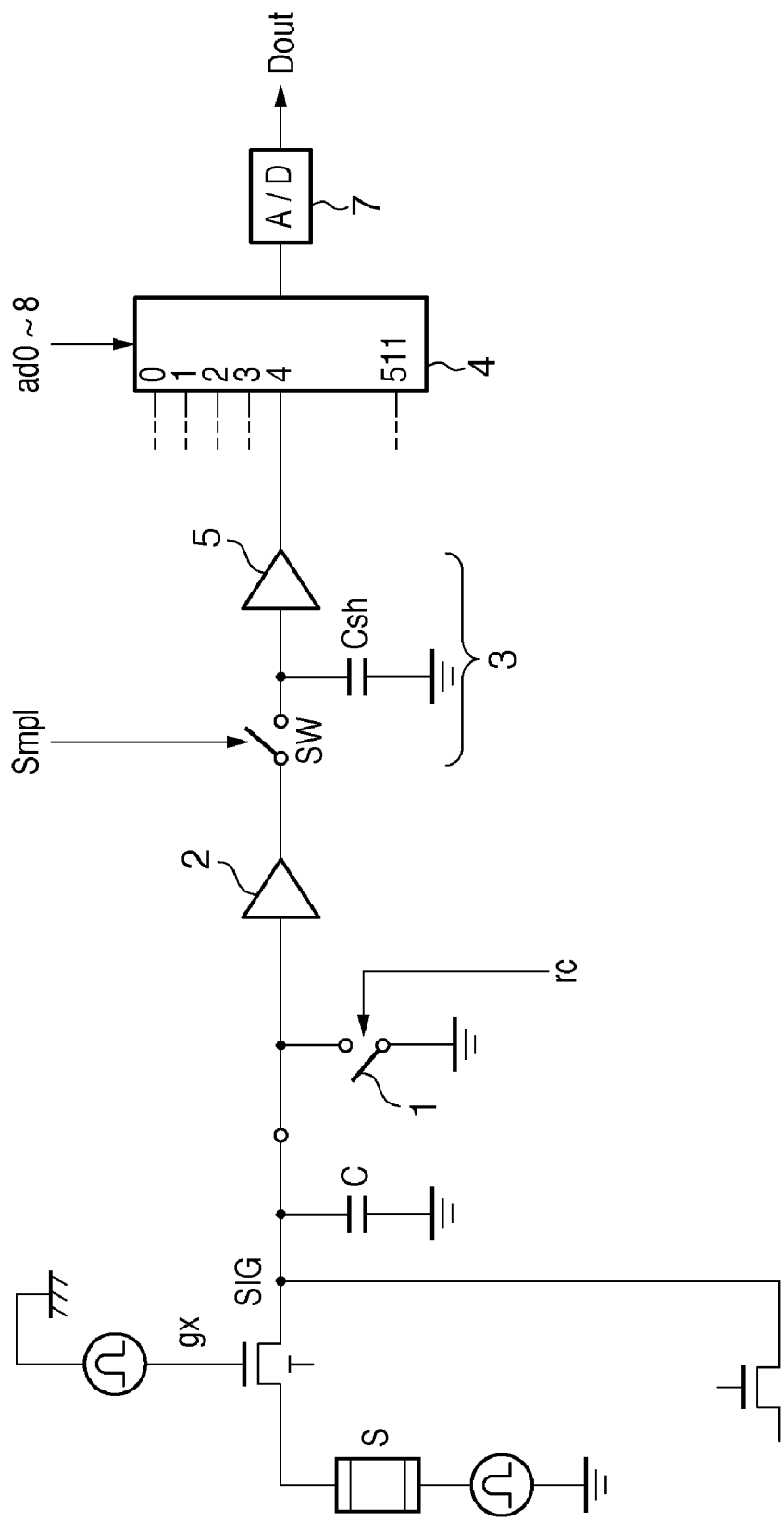
FIG. 28 is a circuit diagram for explaining a prior art.

A problem to be solved by the present invention will be described in detail with reference to FIG. 27. FIG. 27 is a circuit diagram showing the arrangement of one column in an image sensing apparatus 2000.

The image sensing apparatus 2000 includes the following constituent elements.

In a pixel array PA2000, a plurality of active pixels including pixels 2001 and 2002 are arrayed in directions along rows and columns. A line memory 2010 is connected to pixels on a plurality of columns in the pixel array PA2000 via a plurality of column signal lines SIG. The pixels 2001 and 2002 belong to a single column, and are connected to a single column signal line SIG. The column signal line SIG is connected to a constant current load 2003.

A vertical scanning circuit (not shown) selects a readout row (readout pixels) to read out a signal in the pixel array PA2000. Signals are read out from the selected readout row to the line memory 2010 via a plurality of column signal lines SIG.

The line memory 2010 includes capacitances 2004, 2005, 2008, and 2009, and impedance converters 2006 and 2007.

Upon receiving an active-level selection control signal from the vertical scanning circuit, a selection unit (selection transistor) SEL is turned on to turn the pixel into a selected state. In the selected pixel, the gate of a pixel output unit (source follower transistor) SF receives, via a transfer unit TX, a signal generated by a photoelectric conversion unit PD. The pixel output unit SF and constant current load 2003 amplify the signal, outputting the amplified signal to the signal line SIG.

More specifically, in the first period in which the pixel 2001 is selected, a noise signal Vn is read out from the pixel 2001 to the capacitance 2005. After that, an optical signal Vs obtained by superimposing an image signal on the noise signal Vn is read out from the pixel 2001 to the capacitance 2004.

In the second period in which the pixel 2001 is selected, the optical signal read out to the capacitance 2004 is transferred to the capacitance 2008 via the impedance converter 2006. The capacitance 2008 holds the transferred optical signal. The noise signal read out to the capacitance 2005 is transferred to the capacitance 2009 via the impedance converter 2007. The capacitance 2009 holds the transferred noise signal.

In the third period in which the pixel 2001 is selected, the optical signal held in the capacitance 2008 is read out to an output line (not shown) on the subsequent stage. The noise signal held in the capacitance 2009 is read out to an output line (not shown) on the subsequent stage. An output amplifier (not shown) receives the optical and noise signals via the output lines, and outputs the difference between them, generating an image signal. The output amplifier outputs the image signal to the outside of the image sensing apparatus 2000.

Assume that an operation to read out the signals of a predetermined pixel (e.g., the pixel 2001) from the capacitances 2008 and 2009 to the output lines, and an operation to read out signals from another pixel (e.g., the pixel 2002) to the capacitances 2004 and 2005 are executed in parallel. This can shorten the readout period to read out signals from the pixel array to the output amplifier.

However, optical and noise signals are transferred to the output amplifier while the optical signal contains the offset of the impedance converter 2006 and the noise signal contains the offset of the impedance converter 2007. In this case, even if the output amplifier calculates the difference between the optical and noise signals, the difference between the offsets of the impedance converters 2006 and 2007 still remains as noise in the image signal. It is therefore required to reduce the offset component in the image signal and improve the quality of an image obtained from the image signal.

Figure 1:
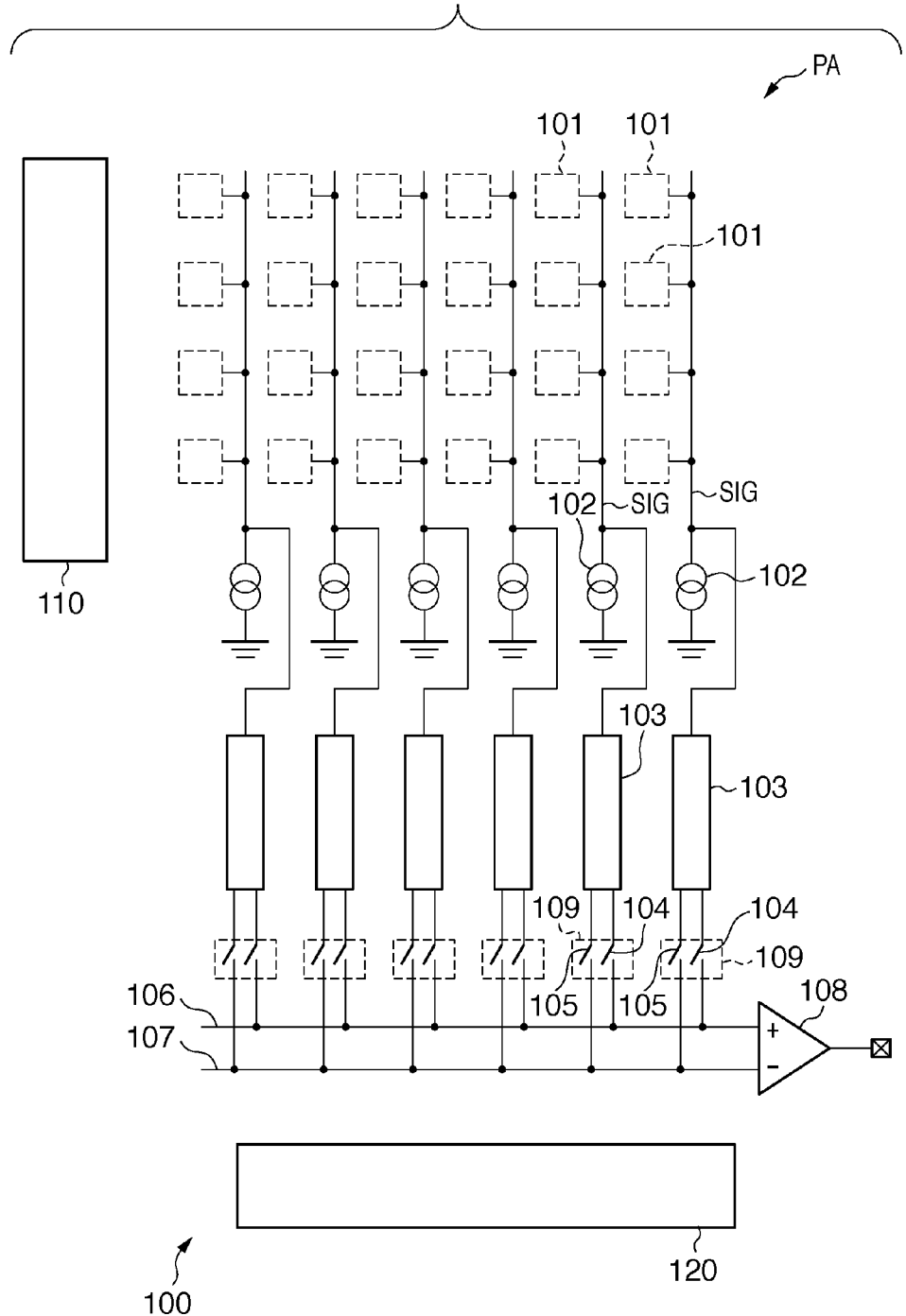
FIG. 1 is a diagram of the arrangement of an image sensing apparatus 100 according to the first embodiment of the present invention.

An image sensing apparatus 100 according to the first embodiment of the present invention will be described with reference to FIG. 1. FIG. 1 is a diagram of the arrangement of the image sensing apparatus 100 according to the first embodiment of the present invention.

The image sensing apparatus 100 is a CMOS image sensor used in an image input device for a video camera, digital still camera, or image scanner. The image sensing apparatus 100 includes a pixel array PA, a plurality of column signal lines SIG, a vertical scanning circuit 110, a plurality of readout circuits (a plurality of transfer blocks) 103, a plurality of column transfer units 109, a horizontal scanning circuit 120, and an output amplifier (output unit) 108.

In the pixel array PA, a plurality of pixels 101 are arrayed in directions along rows and columns. In FIG. 1, the pixel array PA is made up of 4×6 pixels 101.

The column signal lines SIG are connected to the pixels 101 on respective columns in the pixel array PA. Each column signal line SIG is connected to a constant current source 102. The constant current source 102 supplies a constant current to the column signal line SIG.

The vertical scanning circuit 110 scans the pixel array PA vertically (direction along the column) to select a readout row (readout pixels) to read out a signal. The vertical scanning circuit 110 drives the pixels (readout pixels) on the selected readout row to output signals therefrom to the column signal lines SIG.

The readout circuits 103 are arranged in correspondence with the pixels 101 on respective columns in the pixel array PA. Each readout circuit 103 reads out a signal from a pixel on each column that is output to the column signal line SIG. More specifically, the readout circuit 103 temporarily holds optical and noise signals received from the readout pixel 101 at different timings while the readout pixel 101 (on a readout row) in the pixel array PA is selected. The readout circuit 103 includes an optical signal transfer unit (first transfer unit) 103S and a noise signal transfer unit (second transfer unit) 103N, which will be described later. The optical signal transfer unit 103S temporarily holds an optical signal. The noise signal transfer unit 103N temporarily holds a noise signal.

The column transfer units 109 are arranged in correspondence with the pixels 101 on respective columns in the pixel array PA. Each column transfer unit 109 transfers optical and noise signals held in the readout circuit 103 to the output amplifier 108. The column transfer unit 109 includes transfer switches 104 and 105.

The transfer switch 104 connects/disconnects the optical signal transfer unit 103S to/from an optical signal output line 106. The transfer switch 104 is turned on to transfer an optical signal held in the optical signal transfer unit 103S to the output amplifier 108 via the optical signal output line 106.

The transfer switch 105 connects/disconnects the noise signal transfer unit 103N to/from a noise signal output line 107. The transfer switch 105 is turned on to transfer a noise signal held in the noise signal transfer unit 103N to the output amplifier 108 via the noise signal output line 107.

The horizontal scanning circuit 120 scans the column transfer units 109 horizontally (direction along the row) to sequentially turn on the transfer switches 104 and 105 on respective columns. Then, optical signals held in the optical signal transfer units 103S on the respective columns are sequentially read out to the output amplifier 108 via the optical signal output line 106. Noise signals held in the noise signal transfer units 103N on the respective columns are sequentially output to the output amplifier 108 via the noise signal output line 107.

The output amplifier 108 receives optical and noise signals from the optical signal transfer unit 103S and noise signal transfer unit 103N of the readout circuit 103 on each column. The output amplifier 108 outputs the difference between the received optical and noise signals, generating and outputting an image signal. The output amplifier 108 is, for example, a differential amplifier.

Figure 2:
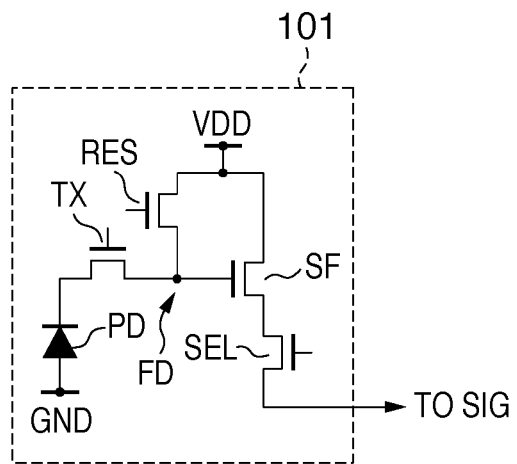
FIG. 2 is a circuit diagram showing the structure of a pixel 101.

The structure of each pixel 101 in the pixel array PA will be explained with reference to FIG. 2. FIG. 2 is a circuit diagram showing the structure of the pixel 101.

The pixel 101 includes a photoelectric conversion unit PD, transfer unit TX, charge-voltage converter FD, reset unit RES, selection unit SEL, and pixel output unit SF.

The photoelectric conversion unit PD generates and accumulates charges corresponding to light. The photoelectric conversion unit PD is, for example, a photodiode.

The transfer unit TX transfers charges generated in the photoelectric conversion unit PD to the charge-voltage converter FD. The transfer unit TX is, for example, a transfer MOS transistor. Upon receiving an active-level transfer control signal at the gate from the vertical scanning circuit 110 (see FIG. 1), the transfer unit TX is turned on to transfer signal charges generated in the photoelectric conversion unit PD to the charge-voltage converter FD.

The charge-voltage converter FD converts the transferred charges into a voltage. The charge-voltage converter FD is, for example, a floating diffusion.

The reset unit RES resets the charge-voltage converter FD. The reset unit RES is, for example, a reset MOS transistor. Upon receiving an active-level reset control signal at the gate from the vertical scanning circuit 110 (see FIG. 1), the reset unit RES is turned on to reset the charge-voltage converter FD (to the potential of a reset power supply VDD).

The selection unit SEL selects/deselects the pixel 101. The selection unit SEL is, for example, a selection MOS transistor. Upon receiving an active/nonactive-level selection control signal at the gate from the vertical scanning circuit 110 (see FIG. 1), the selection unit SEL is turned on/off to select/deselect the pixel 101.

The pixel output unit SF outputs a signal corresponding to the voltage of the charge-voltage converter FD to the column signal line SIG. The pixel output unit SF is, for example, a source follower MOS transistor SF. The pixel output unit SF performs a source follower operation together with the constant current source 102 connected to the column signal line SIG, outputting a signal corresponding to the voltage of the charge-voltage converter FD to the column signal line SIG. More specifically, the pixel output unit SF outputs a noise signal corresponding to the voltage of the charge-voltage converter FD to the column signal line SIG after the charge-voltage converter FD is reset by the reset unit RES. The pixel output unit SF outputs an optical signal corresponding to the voltage of the charge-voltage converter FD to the column signal line SIG after charges in the photoelectric conversion unit PD are transferred to the charge-voltage converter FD by the transfer unit TX.

Figure 3:
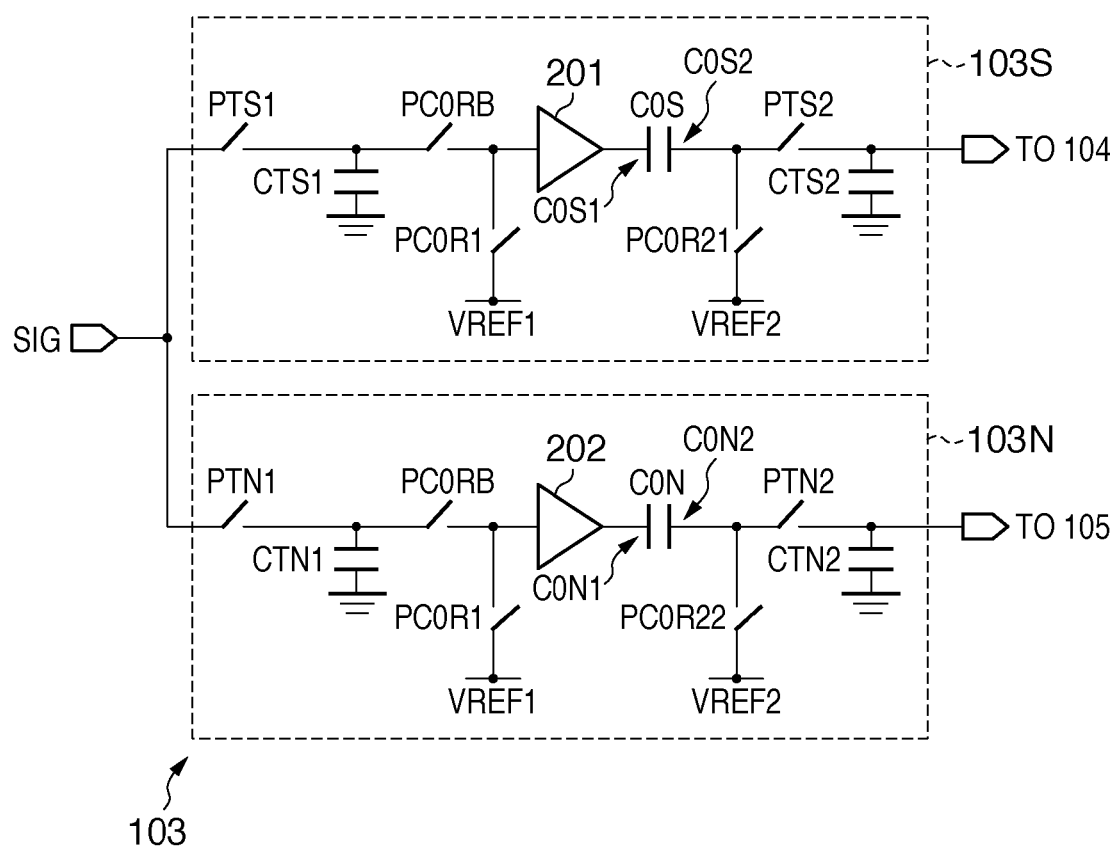
FIG. 3 is a circuit diagram showing the structure of a readout circuit 103 on each column.

The structure of the readout circuit 103 on each column will be explained with reference to FIG. 3. FIG. 3 is a circuit diagram showing the structure of the readout circuit 103 on each column.

The readout circuit 103 includes the optical signal transfer unit 103S and noise signal transfer unit 103N.

The optical signal transfer unit 103S includes a switch PTS1, first holding unit CTS1, switch PC0RB, first impedance converter 201, switch PC0R1, and first clamp capacitance C0S. The optical signal transfer unit 103S also includes a first switch PC0R21, switch PTS2, and second holding unit CTS2.

The optical signal transfer unit 103S switches between a fifth state and a sixth state. In the fifth state, the output terminal of the first impedance converter 201 is connected to a first electrode C0S1 of the first clamp capacitance C0S, and a reference voltage VREF2 is supplied to a second electrode C0S2. In the sixth state, no reference voltage VREF2 is supplied to the second electrode C0S2 while the connection between the output terminal of the first impedance converter 201 and the first electrode C0S1 is maintained.

The switch PTS1 samples an optical signal serving as the first signal. The switch PTS1 is turned on to transfer, to the first holding unit CTS1, an optical signal output from the pixel 101 to the column signal line SIG. The switch PTS1 is turned off to hold the transferred optical signal in the first holding unit CTS1.

The first holding unit CTS1 holds the optical signal transferred from the pixel 101 via the switch PTS1.

The switch PC0RB transfers the optical signal held in the first holding unit CTS1 to the first impedance converter 201.

The first impedance converter 201 converts the impedance of the transferred optical signal, and outputs the converted optical signal. The first impedance converter 201 transfers the optical signal held in the first holding unit CTS1 to the second holding unit CTS2. The first impedance converter 201 has a first offset Vof1. The first impedance converter 201 is, for example, a buffer amplifier.

Figure 23:
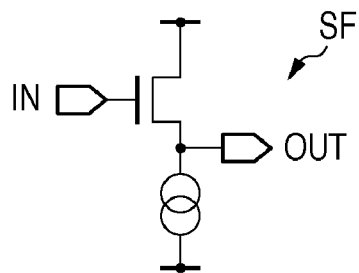
FIG. 23 is a circuit diagram showing an example of the structure of an impedance converter.
Figure 24:
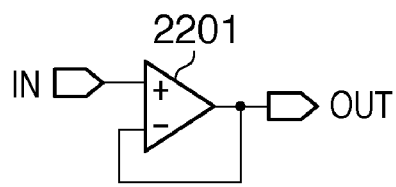
FIG. 24 is a circuit diagram showing an example of the structure of the impedance converter.
Figure 25:
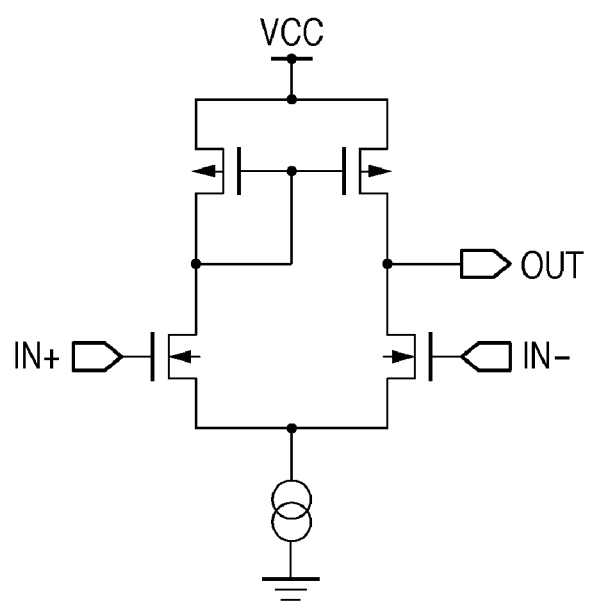
FIG. 25 is a circuit diagram showing an example of the structure of an operational amplifier.

The first impedance converter 201 may also be a source follower SF as shown in FIG. 23, or a voltage follower using an operational amplifier 2201 as shown in FIG. 24. The operational amplifier 2201 in FIG. 24 may also be a differential amplifier as shown in FIG. 25.

The switch PC0R1 is turned on to supply a reference voltage VREF1 to the input of the first impedance converter 201.

The first clamp capacitance C0S clamps a signal output from the first impedance converter 201. The first clamp capacitance C0S has the first electrode C0S1 and second electrode C0S2. The first electrode C0S1 receives the first offset Vof1 from the first impedance converter. For example, the second electrode C0S2 opposes the first electrode C0S1. The second electrode C0S2 supplies, as an optical signal serving as the third signal, the difference signal between the first offset Vof1 of the first impedance converter 201 and a signal obtained by superimposing the first offset Vof1 on the optical signal. The optical signal supplied from the second electrode C0S2 does not contain the first offset Vof1.

The first switch PC0R21 is turned on to supply the reference voltage VREF2 to the second electrode C0S2. The first switch PC0R21 is turned off to supply an optical signal which does not contain the first offset Vof1 from the second electrode C0S2.

The switch PTS2 samples a signal supplied from the second electrode C0S2. The switch PTS2 is turned on to transfer an optical signal supplied from the second electrode C0S2 to the second holding unit CTS2. The switch PTS2 is turned off to hold the transferred optical signal in the second holding unit CTS2.

The second holding unit CTS2 holds an optical signal transferred from the second electrode C0S2 via the switch PTS2. The second holding unit CTS2 holds an optical signal transferred from the first impedance converter 201. The optical signal held in the second holding unit CTS2 is read out to the output amplifier 108 via the optical signal output line 106 when the transfer switch 104 on the subsequent stage is turned on.

The noise signal transfer unit 103N includes a switch PTN1, third holding unit CTN1, switch PC0RB, second impedance converter 202, switch PC0R1, and second clamp capacitance C0N. The noise signal transfer unit 103N also includes a second switch PC0R22, switch PTN2, and fourth holding unit CTN2.

The noise signal transfer unit 103N switches between a seventh state and an eighth state. In the seventh state, the output terminal of the second impedance converter 202 is connected to a third electrode C0N1 of the second clamp capacitance C0N, and the reference voltage VREF2 is supplied to a fourth electrode C0N2. In the eighth state, no reference voltage VREF2 is supplied to the fourth electrode C0N2 while the connection between the output terminal of the second impedance converter 202 and the third electrode C0N1 is maintained.

The switch PTN1 samples a noise signal serving as the second signal. The switch PTN1 is turned on to transfer, to the third holding unit CTN1, a noise signal output from the pixel 101 to the column signal line SIG. The switch PTN1 is turned off to hold the transferred noise signal in the third holding unit CTN1.

The third holding unit CTN1 holds the noise signal transferred from the pixel 101 via the switch PTN1.

The switch PC0RB transfers the noise signal held in the third holding unit CTN1 to the second impedance converter 202.

The second impedance converter 202 converts the impedance of the transferred noise signal, and outputs the converted noise signal. The second impedance converter 202 transfers the noise signal held in the third holding unit CTN1 to the fourth holding unit CTN2. The second impedance converter 202 has a second offset Vof2. The second impedance converter 202 is, for example, a buffer amplifier.

The second impedance converter 202 may also be a source follower SF as shown in FIG. 23, or a voltage follower using the operational amplifier 2201 as shown in FIG. 24. The operational amplifier 2201 in FIG. 24 may also be a differential amplifier as shown in FIG. 25.

The switch PC0R1 is turned on to supply the reference voltage VREF1 to the input of the second impedance converter 202.

The second clamp capacitance C0N clamps a signal output from the second impedance converter 202. The second clamp capacitance C0N has the third electrode C0N1 and fourth electrode C0N2. The third electrode C0N1 receives the second offset Vof2 from the second impedance converter 202. For example, the fourth electrode C0N2 opposes the third electrode C0N1. The fourth electrode C0N2 supplies, as a noise signal serving as the fourth signal, the difference signal between the second offset Vof2 of the second impedance converter 202 and a signal obtained by superimposing the second offset Vof2 on the noise signal. The noise signal supplied from the fourth electrode C0N2 does not contain the second offset Vof2.

The second switch PC0R22 is turned on to supply the reference voltage VREF2 to the fourth electrode C0N2. The second switch PC0R22 is turned off to supply a noise signal which does not contain the second offset Vof2 from the fourth electrode C0N2.

The switch PTN2 samples a signal supplied from the fourth electrode C0N2. The switch PTN2 is turned on to transfer a noise signal supplied from the fourth electrode C0N2 to the fourth holding unit CTN2. The switch PTN2 is turned off to hold the transferred noise signal in the fourth holding unit CTN2.

The fourth holding unit CTN2 holds a noise signal transferred from the fourth electrode C0N2 via the switch PTN2. The fourth holding unit CTN2 holds a noise signal transferred from the second impedance converter 202. The noise signal held in the fourth holding unit CTN2 is read out to the output amplifier 108 via the noise signal output line 107 when the transfer switch 105 on the subsequent stage is turned on.

Figure 4:
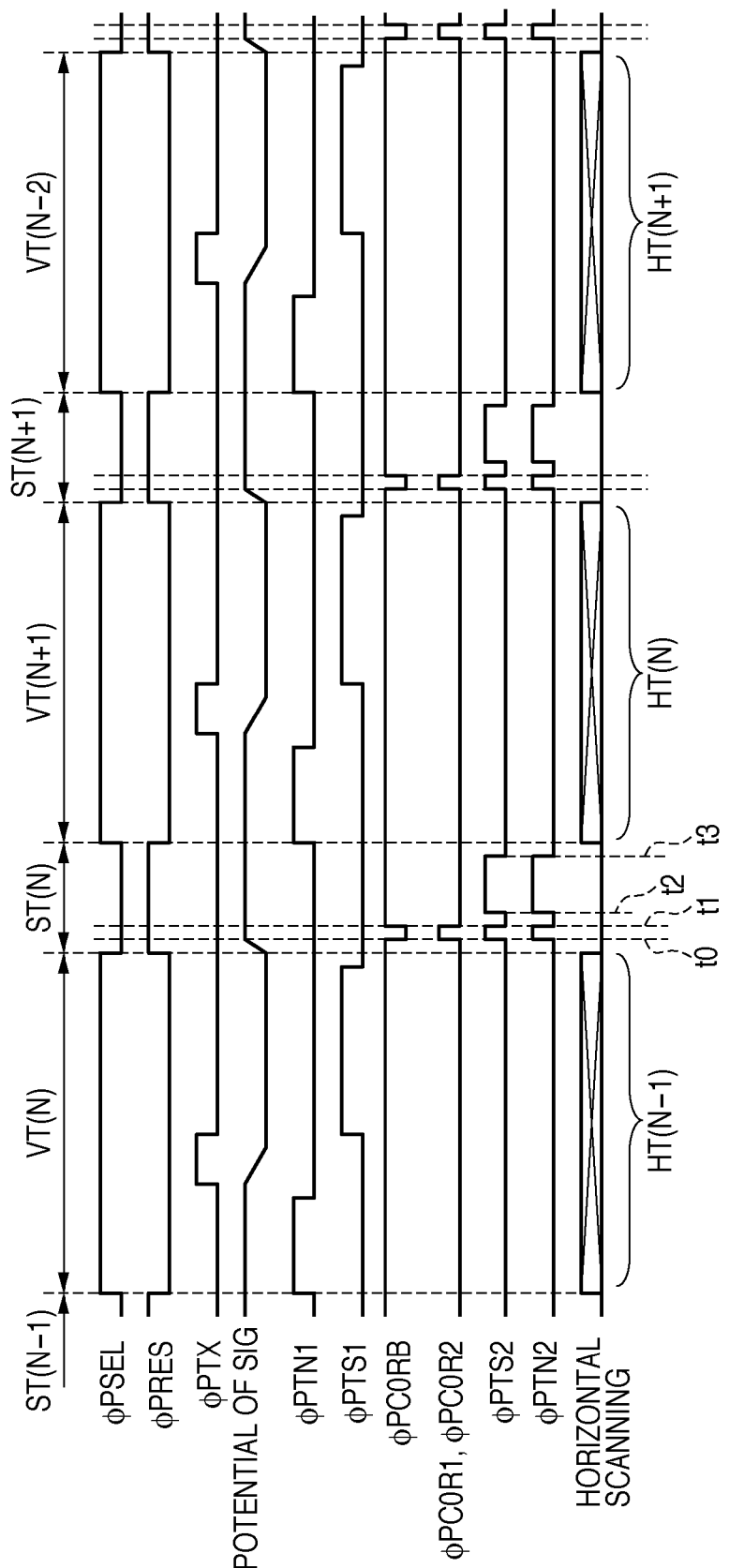
FIG. 4 is a timing chart showing the operation of the readout circuit 103 on each column.

The operation of the readout circuit 103 on each column will be explained with reference to FIG. 4. FIG. 4 is a timing chart showing the operation of the readout circuit 103 on each column. FIG. 4 also shows a change of the potential of the column signal line SIG in addition to the waveforms of control signals.

As shown in FIG. 4, the vertical transfer periods VT and sampling periods ST of respective rows are defined in series. For example, the vertical transfer period VT(N) of the Nth row, the sampling period ST(N) of the Nth row, the vertical transfer period VT(N+1) of the (N+1)th row, the sampling period ST(N+1) of the (N+1)th row, the vertical transfer period VT(N+2) of the (N+2)th row, . . . are set sequentially.

The vertical transfer period VT of each row contains a horizontal transfer period HT for signals of an immediately preceding row that has been read out (vertically transferred). For example, the vertical transfer period VT(N) of the Nth row contains the horizontal transfer period HT(N−1) of the (N−1)th row. The vertical transfer period VT(N+1) of the (N+1)th row contains the horizontal transfer period HT(N) of the Nth row. The vertical transfer period VT(N+2) of the (N+2)th row contains the horizontal transfer period HT(N+1) of the (N+1)th row.

An operation in each period will be exemplified for the signals of pixels on the Nth row.

In the sampling period ST(N−1) immediately before the vertical transfer period VT(N), the vertical scanning circuit 110 supplies an active-level control signal ϕPRES to the reset units RES of the pixels on the Nth row in the pixel array PA. In the pixels on the Nth row, the reset units RES reset the charge-voltage converters FD, and the pixel output units SF output noise signals to the column signal lines SIG.

In the vertical transfer period VT(N), the vertical scanning circuit 110 supplies an active-level control signal (selection control signal) ϕPSEL to the selection units SEL of the pixels on the Nth row in the pixel array PA, thereby selecting the pixels on the Nth row. The vertical scanning circuit 110 supplies an active-level control signal ϕPTN1 to the switches PTN1 of the noise signal transfer units 103N on the respective columns. In response to this, the switches PTN1 are turned on to transfer, to the third holding units CTN1, the noise signals output from the pixels 101 to the column signal lines SIG. At this time, the switches PTN1 are turned off to hold the transferred noise signals in the third holding units CTN1. The switches PTN2 are OFF.

Then, the vertical scanning circuit 110 supplies an active-level control signal (transfer control signal) ϕPTX to the transfer units TX of the pixels on the Nth row. In the pixels on the Nth row, the transfer units TX transfer charges in the photoelectric conversion units PD to the charge-voltage converters FD, and the pixel output units SF output optical signals to the column signal lines SIG. The vertical scanning circuit 110 supplies an active-level control signal ϕPTS1 to the switches PTS1 of the optical signal transfer units 103S on the respective columns. Then, the switches PTS1 are turned on to transfer, to the first holding units CTS1, the optical signals output from the pixels 101 to the column signal lines SIG. After that, the switches PTS1 are turned off to hold the transferred optical signals in the first holding units CTS1. At this time, the switches PTS2 are OFF.

At the timing of which the vertical transfer period VT(N) ends, the vertical scanning circuit 110 supplies a nonactive-level control signal ϕPSEL to the selection units SEL of the pixels on the Nth row in the pixel array PA, thereby deselecting the pixels (readout pixels) on the Nth row. That is, in the vertical transfer period VT(N), the pixels (readout pixels) on the Nth row are selected. At a timing in this period, the vertical scanning circuit 110 supplies an active-level control signal ϕPRES to the reset units RES of the pixels on the Nth row in the pixel array PA.

In the horizontal transfer period HT(N−1) during the vertical transfer period VT(N), the horizontal scanning circuit 120 sequentially turns on the transfer switches 104 and 105 on the respective columns. The optical signals held in the second holding units CTS2 of the optical signal transfer units 103S on the respective columns are read out in series to the output amplifier 108 via the optical signal output line 106. The noise signals held in the fourth holding units CTN2 of the noise signal transfer units 103N on the respective columns are read out in series to the output amplifier 108 via the noise signal output line 107.

In this way, an operation to read out signals from pixels on the Nth row to the first or third holding unit, and an operation to read out the signals of pixels on the (N−1)th row from the second holding unit to the optical signal output line and from the fourth holding unit to the noise signal output line are executed in parallel. This can shorten the readout period to read out signals from the pixel array PA to the output amplifier 108.

At time t0 in the sampling period ST(N) of the Nth row, the vertical scanning circuit 110 supplies a nonactive-level control signal ϕPC0RB to the switches PC0RB of the optical signal transfer units 103S and noise signal transfer units 103N on the respective columns, thereby turning them off. As a result, the first holding units CTS1 on the respective columns keep holding the optical signals of the pixels on the Nth row. The third holding units CTN1 on the respective columns keep holding the noise signals of the pixels on the Nth row.

At time t0, the vertical scanning circuit 110 supplies an active-level control signal ϕPC0R1 to the switches PC0R1 of the optical signal transfer units 103S and noise signal transfer units 103N on the respective columns, thereby turning them on. The first impedance converters 201 receive the reference voltage VREF1 to supply, to the first electrodes C0S1 of the first clamp capacitances C0S, signals obtained by superimposing the first offset Vof1 on the reference voltage VREF1. The second impedance converters 202 receive the reference voltage VREF1 to supply, to the third electrodes C0N1 of the second clamp capacitances C0N, signals obtained by superimposing the second offset Vof2 on the reference voltage VREF1.

At time t0, the vertical scanning circuit 110 supplies an active-level control signal ϕPC0R2 to the first switches PC0R21 of the optical signal transfer units 103S on the respective columns. The second electrodes C0S2 of the first clamp capacitances C0S receive the reference voltage VREF2. The vertical scanning circuit 110 supplies an active-level control signal ϕPC0R2 to the second switches PC0R22 of the noise signal transfer units 103N on the respective columns. The fourth electrodes C0N2 of the second clamp capacitances C0N receive the reference voltage VREF2.

At time t0, the vertical scanning circuit 110 supplies an active-level control signal ϕPTS2 to the switches PTS2 of the optical signal transfer units 103S on the respective columns. In response to this, the switches PTS2 are turned on to reset the second holding units CTS2. Similarly, the vertical scanning circuit 110 supplies an active-level control signal ϕPTN2 to the switches PTN2 of the noise signal transfer units 103N on the respective columns. Then, the switches PTN2 are turned on to reset the fourth holding units CTN2.

At time t1, the vertical scanning circuit 110 supplies an active-level control signal ϕPC0RB to the switches PC0RB of the optical signal transfer units 103S and noise signal transfer units 103N on the respective columns, thereby turning them on. The first impedance converters 201 receive the optical signals held in the first holding units CTS1 on the respective columns to supply, to the first electrodes C0S1, signals obtained by superimposing the first offset Vof1 on the sum of the optical signals and the reference voltage VREF1. Similarly, the second impedance converters 202 receive the noise signals held in the third holding units CTN1 on the respective columns to supply, to the third electrodes C0N1, signals obtained by superimposing the second offset Vof2 on the sum of the noise signals and the reference voltage VREF1.

At time t2, the vertical scanning circuit 110 supplies an active-level control signal ϕPTS2 to the switches PTS2 of the optical signal transfer units 103S on the respective columns, thereby turning them on. By the clamping operation of the first clamp capacitances C0S, the second electrodes C0S2 supply optical signals, each of which does not contain the first offset Vof1. That is, each second electrode C0S2 supplies, as an optical signal to the second holding unit CTS2, the difference signal between the first offset Vof1 of the first impedance converter 201 and a signal obtained by superimposing the first offset Vof1 on the optical signal. The optical signal supplied from the second electrode C0S2 does not contain the first offset Vof1.

At time t2, the vertical scanning circuit 110 supplies an active-level control signal φPTN2 to the switches PTN2 of the noise signal transfer units 103N on the respective columns, thereby turning them on. By the clamping operation of the second clamp capacitances C0N, the fourth electrodes C0N2 supply noise signals, each of which does not contain the second offset Vof2. That is, each fourth electrode C0N2 supplies, as a noise signal to the fourth holding unit CTN2, the difference signal between the second offset Vof2 of the second impedance converter 202 and a signal obtained by superimposing the second offset Vof2 on the noise signal. The noise signal supplied from the fourth electrode C0N2 does not contain the second offset Vof2.

At time t3, the vertical scanning circuit 110 supplies a nonactive-level control signal φPTS2 to the switches PTS2 of the optical signal transfer units 103S on the respective columns, thereby turning them off. Then, the second holding units CTS2 hold the received optical signals.

At time t3, the vertical scanning circuit 110 supplies a nonactive-level control signal φPTN2 to the switches PTN2 of the noise signal transfer units 103N on the respective columns, thereby turning them off. The fourth holding units CTN2 hold the received noise signals.

In the sampling period ST(N) of the Nth row, the control signal φPSEL to pixels on the (N+1)th row is maintained at a nonactive-level, and the control signal φPRES to the pixels on the (N+1)th row is maintained at an active level. While the pixels on the (N+1)th row are deselected, the reset units RES reset the charge-voltage converters FD.

In the horizontal transfer period HT(N) during the vertical transfer period VT(N+1) subsequent to the sampling period ST(N), the horizontal scanning circuit 120 sequentially turns on the transfer switches 104 and 105 on the respective columns. In response to this, the optical signals held in the second holding units CTS2 of the optical signal transfer units 103S on the respective columns are read out in series to the output amplifier 108 via the optical signal output line 106. The noise signals held in the fourth holding units CTN2 of the noise signal transfer units 103N on the respective columns are read out in series to the output amplifier 108 via the noise signal output line 107.

As described above, the optical signal transfer unit 103S outputs, as an optical signal to the output amplifier 108, the difference between the first offset Vof1 of the first impedance converter 201 and a signal obtained by superimposing the first offset Vof1 on the optical signal. The noise signal transfer unit 103N outputs, as a noise signal to the output amplifier 108, the difference between the second offset Vof2 of the second impedance converter 202 and a signal obtained by superimposing the second offset Vof2 on the noise signal. The output amplifier 108 can output the difference between the optical signal which does not contain the first offset Vof1 and the noise signal which does not contain the second offset Vof2, generating and outputting an image signal. Accordingly, even if optical and noise signals are read out from a pixel to the output amplifier via different impedance converters, the image signal hardly contains the offsets of the impedance converters.

Figure 5:
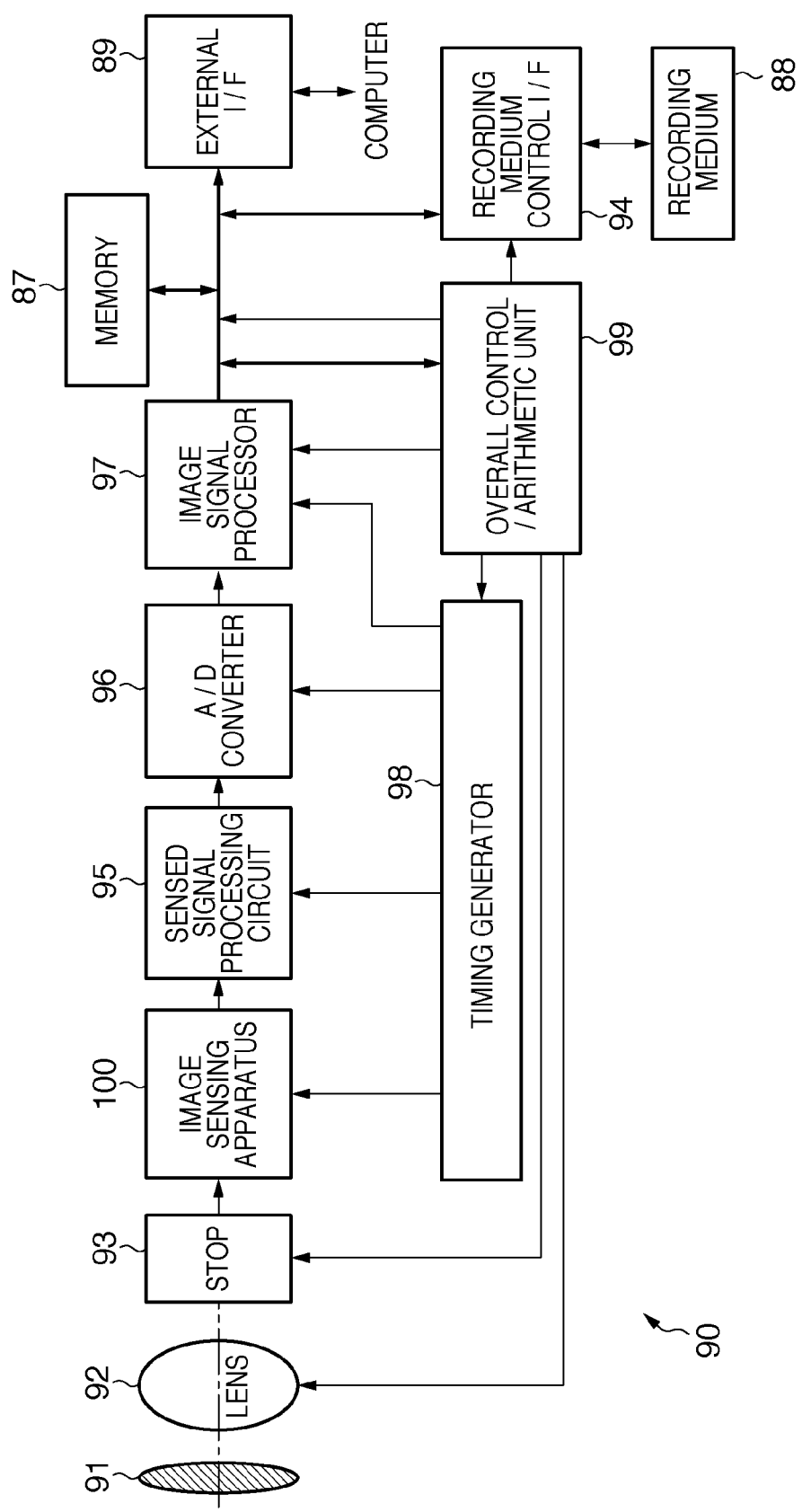
FIG. 5 is a block diagram of the configuration of an imaging system to which the image sensing apparatus according to the first embodiment is applied.

FIG. 5 shows an example of an imaging system to which the image sensing apparatus of the present invention is applied.

As shown in FIG. 5, an imaging system 90 mainly includes an optical system, the image sensing apparatus 100, and a signal processing unit. The optical system mainly includes a shutter 91, lens 92, and stop 93. The signal processing unit mainly includes a sensed signal processing circuit 95, A/D converter 96, image signal processor 97, memory 87, external I/F 89, timing generator 98, overall control/arithmetic unit 99, recording medium 88, and recording medium control I/F 94. The signal processing unit may not include the recording medium 88.

The shutter 91 is arranged in front of the lens 92 on the optical path to control the exposure.

The lens 92 refracts incident light to form an object image on the pixel array (image sensing surface) of the image sensing apparatus 100.

The stop 93 is interposed between the lens 92 and the image sensing apparatus 100 on the optical path. The stop 93 adjusts the quantity of light guided to the image sensing apparatus 100 after passing through the lens 92.

The image sensing apparatus 100 converts an object image formed on the pixel array into an image signal. The image sensing apparatus 100 reads out the image signal from the pixel array, and outputs it.

The sensed signal processing circuit 95 is connected to the image sensing apparatus 100, and processes an image signal output from the image sensing apparatus 100.

The A/D converter 96 is connected to the sensed signal processing circuit 95. The A/D converter 96 converts a processed image signal (analog signal) output from the sensed signal processing circuit 95 into a digital signal.

The image signal processor 97 is connected to the A/D converter 96. The image signal processor 97 performs various arithmetic processes such as correction for an image signal (digital signal) output from the A/D converter 96, generating image data. The image signal processor 97 supplies the image data to the memory 87, external I/F 89, overall control/arithmetic unit 99, recording medium control I/F 94, and the like.

The memory 87 is connected to the image signal processor 97, and stores image data output from the image signal processor 97.

The external I/F 89 is connected to the image signal processor 97. Image data output from the image signal processor 97 is transferred to an external device (e.g., personal computer) via the external I/F The timing generator 98 is connected to the image sensing apparatus 100, sensed signal processing circuit 95, A/D converter 96, and image signal processor 97. The timing generator 98 supplies timing signals to the image sensing apparatus 100, sensed signal processing circuit 95, A/D converter 96, and image signal processor 97. The image sensing apparatus 100, sensed signal processing circuit 95, A/D converter 96, and image signal processor 97 operate in synchronism with the timing signals.

The overall control/arithmetic unit 99 is connected to the timing generator 98, image signal processor 97, and recording medium control I/F 94, and controls all of them.

The recording medium 88 is detachably connected to the recording medium control I/F 94. Image data output from the image signal processor 97 is recorded on the recording medium 88 via the recording medium control I/F 94.

With this arrangement, the image sensing apparatus 100 can provide a high-quality image (image data) as long as it can obtain a high-quality image signal.

An image sensing apparatus 100i according to the second embodiment will be described. A difference from the first embodiment will be mainly explained.

The image sensing apparatus 100i is different from that in the first embodiment in the structure of a readout circuit 103i on each column, as shown in FIG. 6. FIG. 6 is a circuit diagram showing the structure of the readout circuit 103i on each column in the image sensing apparatus 100i according to the second embodiment of the present invention.

The readout circuit 103i includes an optical signal transfer unit 103Si and noise signal transfer unit 103Ni.

The optical signal transfer unit 103Si includes a switch PC0RB1i, switch PC0RB2i, first impedance converter (first differential amplifier) 401i, switch PC0R3i, and first clamp capacitance C0Si, unlike the first embodiment.

The switch PC0RB1i is turned on to transfer an optical signal held in a first holding unit CTS1 to a first electrode C0S1i of the first clamp capacitance C0Si.

The switch PC0RB2i is turned on to transfer a signal supplied from a second electrode C0S2i of the first clamp capacitance C0Si to the non-inverting input terminal of the first impedance converter 401i.

The first impedance converter 401i includes a differential amplifier as shown in FIG. 25 that functions as a voltage follower as shown in FIG. 24.

The first clamp capacitance C0Si can be connected via a switch PC0R3i to a line connecting an output node N1 of the first impedance converter 401i and a second holding unit CTS2.

The switch PC0R3i connects/disconnects the output node N1 of the first impedance converter 401i to/from the first electrode C0S1i of the first clamp capacitance C0Si.

The noise signal transfer unit 103Ni includes a switch PC0RB1i, switch PC0RB2i, second impedance converter (second differential amplifier) 402i, switch PC0R3i, and second clamp capacitance C0Ni, unlike the first embodiment.

The switch PC0RB1i is turned on to transfer a noise signal held in a third holding unit CTN1 to a third electrode C0N1i of the second clamp capacitance C0Ni.

The switch PC0RB2i is turned on to transfer a signal supplied from a fourth electrode C0N2i of the second clamp capacitance C0Ni to the non-inverting input terminal of the second impedance converter 402i.

The second impedance converter 402i includes a differential amplifier as shown in FIG. 25 that functions as a voltage follower as shown in FIG. 24.

The second clamp capacitance C0Ni can be connected via a switch PC0R3i to a line connecting an output node N2 of the second impedance converter 402i and a fourth holding unit CTN2.

The switch PC0R3i connects/disconnects the output node N2 of the second impedance converter 402i to/from the third electrode C0N1i of the second clamp capacitance C0Ni.

Figure 7:
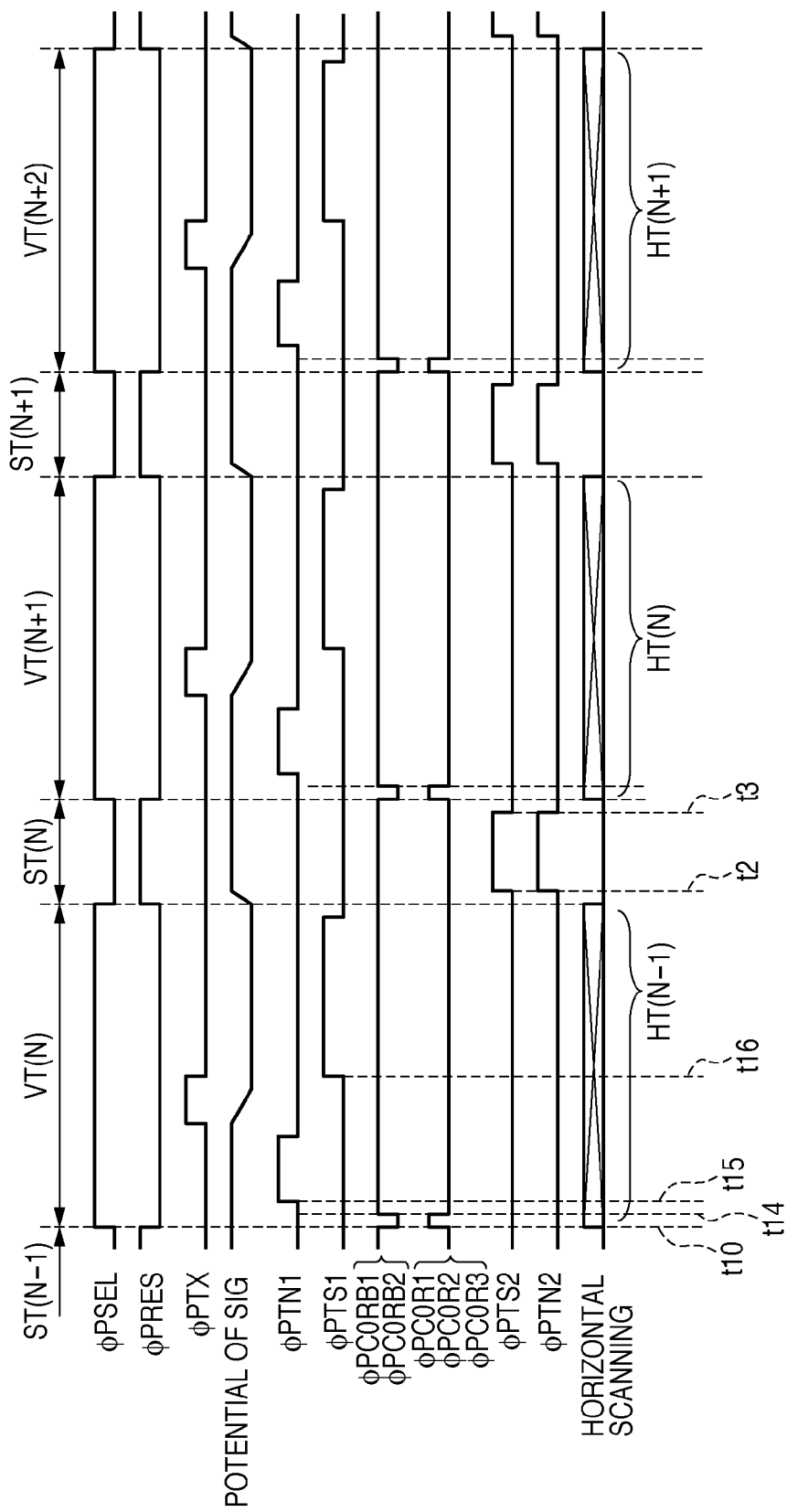
FIG. 7 is a timing chart showing the operation of the readout circuit 103$i$ on each column.

The operation of the readout circuit 103i on each column is different from that in the first embodiment in the following point as shown in FIG. 7. FIG. 7 is a timing chart showing the operation of the readout circuit 103i on each column.

At time t10 in the vertical transfer period VT(N), a vertical scanning circuit 110 supplies a nonactive-level signal φPC0RB1 to the switch PC0RB1i of the optical signal transfer unit 103Si on each column. The vertical scanning circuit 110 supplies a nonactive-level signal φPC0RB2 to the switch PC0RB2i of the noise signal transfer unit 103Ni on each column. In response to this, both the switch PC0RB1i of the optical signal transfer unit 103Si and the switch PC0RB2i of the noise signal transfer unit 103Ni on each column are turned off. The vertical scanning circuit 110 supplies active-level signals φPC0R1, φPC0R2, and φPC0R3 respectively to the switches PC0R1, PC0R21, and PC0R3i of the optical signal transfer unit 103Si and to the switches PC0R1, PC0R22, and PC0R3i of the noise signal transfer unit 103Ni on each column, thereby turning them on.

Figure 8:
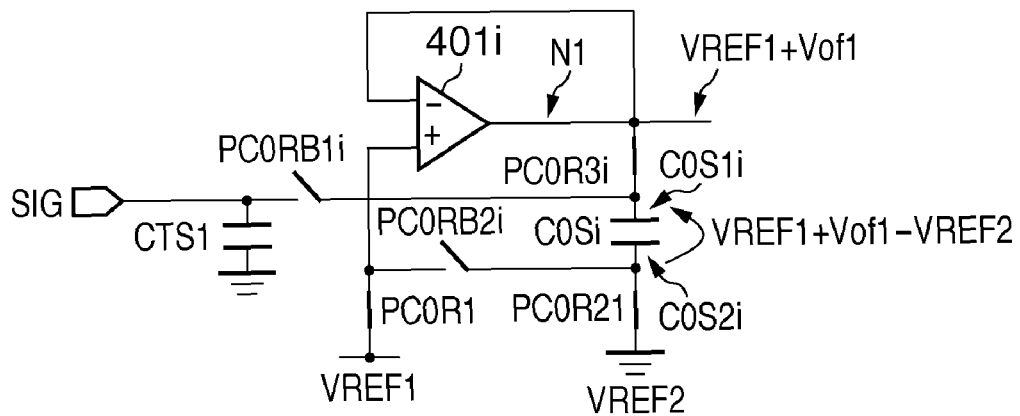
FIG. 8 is a circuit diagram showing the connection state of an optical signal transfer unit 103Si on each column at time t10.

More specifically, the connection state (first state) of the optical signal transfer unit 103Si on each column at time t10 is as shown in FIG. 8. The first impedance converter 401i receives a reference voltage VREF1 at its non-inverting input terminal, and outputs a signal (VREF1+Vof1) from its output terminal to the output node N1. The signal (VREF1+Vof1) is fed back to the inverting input terminal of the first impedance converter 401i, and is input to the first electrode C0S1i of the first clamp capacitance C0Si. At this time, the second electrode C0S2i of the first clamp capacitance C0Si receives a reference voltage VREF2. In response to this, the first clamp capacitance C0Si holds a voltage VC0Si:

$$VC0Si = VREF1 + Vof1 - VREF2 \quad (1)$$

The connection state (third state) of the noise signal transfer unit 103Ni on each column at time t10 is with reference to FIG. 8. At this time, the second clamp capacitance C0Ni of the noise signal transfer unit 103Ni holds a voltage VC0Ni:

$$VC0Ni = VREF1 + Vof2 - VREF2 \quad (2)$$

At time t14, the vertical scanning circuit 110 supplies active-level signals φPC0RB1 and φPC0RB2 respectively to the switches PC0RB1i and PC0RB2i of the optical signal transfer unit 103Si and noise signal transfer unit 103Ni on each column, thereby turning them on. Also, the vertical scanning circuit 110 supplies nonactive-level signals φPC0R1, φPC0R2, and φPC0R3 respectively to the switches PC0R1, PC0R21, and PC0R3i of the optical signal transfer unit 103Si and to the switches PC0R1, PC0R22, and PC0R3i of the noise signal transfer unit 103Ni on each column, thereby turning them off.

Figure 9:
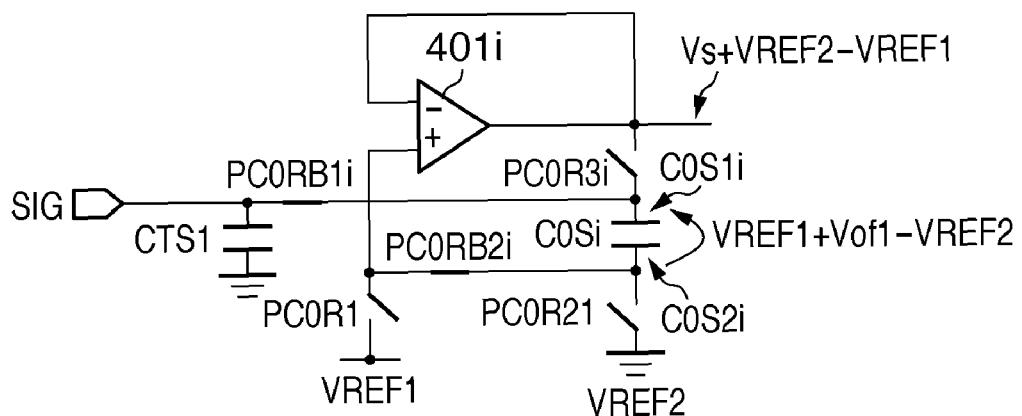
FIG. 9 is a circuit diagram showing the connection state of the optical signal transfer unit 103Si on each column at time t14.

More specifically, the connection state (second state) of the optical signal transfer unit 103Si on each column at time t14 is as shown in FIG. 9. As a result, the first clamp capacitance C0Si holding the voltage VC0Si given by equation (1) is series-inserted between the first holding unit CTS1 and the non-inverting input terminal of the first impedance converter 401i.

At time t16, the first electrode C0S1i of the first clamp capacitance C0Si receives an optical signal Vs of each pixel on the Nth row that is held in the first holding unit CTS1. By the clamping operation of the first clamp capacitance C0Si and first impedance converter 401i, the output terminal of the first impedance converter 401i outputs an optical signal which does not contain the first offset Vof1. More specifically, the output terminal of the first impedance converter 401i outputs a voltage (signal) Vo401i:

$$Vo401i = Vs + VREF2 - VREF1 \quad (3)$$

The connection state (fourth state) of the noise signal transfer unit 103Ni on each column at time t14 is with reference to FIG. 9. At time t15, letting Vn be the noise signal of each pixel on the Nth row that is held in the third holding unit CTN1, the output terminal of the second impedance converter 402i of the noise signal transfer unit 103Ni outputs a voltage (signal) Vo402i:

$$Vo402i = Vn + VREF2 - VREF1 \quad (4)$$

At this time, the output voltage (output signal) Vo401i of the first impedance converter 401i becomes the optical signal Vs by setting $$VREF1 = VREF2 \quad (5)$$

The optical signal output from the first impedance converter 401i does not contain the first offset Vof1. The output voltage (output signal) Vo402i of the second impedance converter 402*i* becomes the noise signal Vn. The noise signal output from the second impedance converter 402*i* does not contain the second offset Vof2.

Alternatively, the DC level of the output signal Vo401*i* of the first impedance converter 401*i* and that of the output signal Vo402*i* of the second impedance converter 402*i* may also be adjusted by setting $$VREF1 \neq VREF2 \qquad (6)$$

By adjusting the DC levels of the output signals Vo401*i* and Vo402*i*, the operating points of the signals on the output line can be freely set to perform desirable signal processing after outputting the signals from the image sensing apparatus.

In the sampling period ST(N) of the Nth row, the operations at times t0 and t1 are not executed, unlike the first embodiment.

In the first embodiment, the clamp capacitance C0Si applies a capacitive division gain C0Si/(C0Si+CTS2) (<1), attenuating the signal amplitude. Hence, the gain of the output amplifier on the final stage needs to be increased.

However, in the second embodiment, no clamp capacitance attenuates the signal amplitude. The output amplifier can therefore operate at low gain which hardly generates noise.

In the readout circuit, a signal passing through the column signal line SIG may also directly charge the clamp capacitances C0Si and C0Ni without arranging the first holding unit CTS1 and third holding unit CTN1. In this case, when the switches PTN1 and PTS1 are turned off, the electrodes of the clamp capacitances C0Si and C0Ni on the sides of the switches PTN1 and PTS1 electrically float. If disturbance noise is mixed in the floating electrodes, it directly appears in the outputs of the impedance converters 401*i* and 402*i*. That is, the adverse effect of disturbance noise can be reduced by arranging the first holding unit CTS1 and third holding unit CTN1 in the readout circuit.

An image sensing apparatus 100*j* according to the third embodiment will be described. A difference from the first embodiment will be mainly explained.

Figure 10:
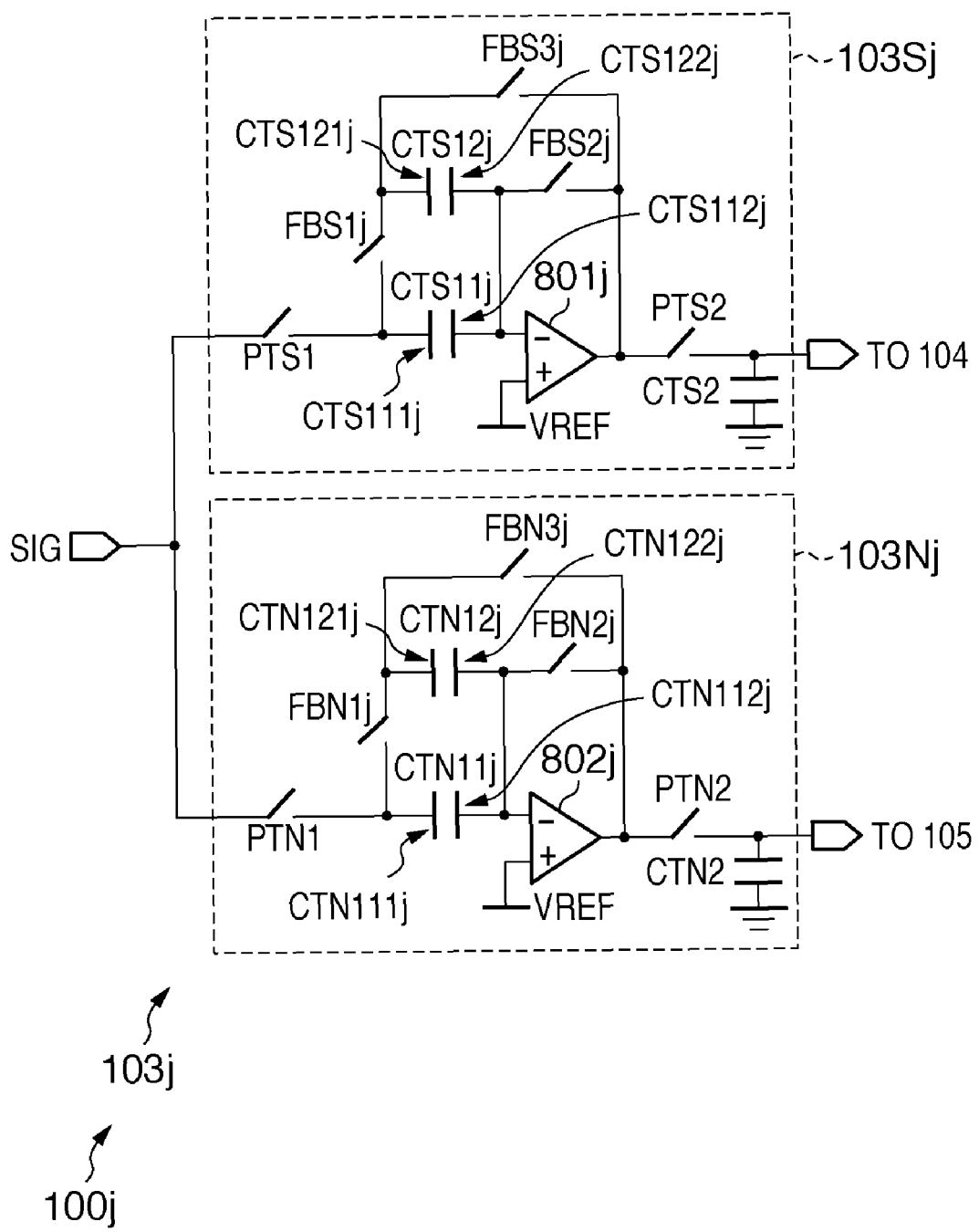
FIG. 10 is a circuit diagram showing the structure of a readout circuit 103$j$ on each column in an image sensing apparatus 100$j$ according to the third embodiment of the present invention.

The image sensing apparatus 100*j* is different from that in the first embodiment in the structure of a readout circuit 103*j* on each column, as shown in FIG. 10. FIG. 10 is a circuit diagram showing the structure of the readout circuit 103*j* on each column in the image sensing apparatus 100*j* according to the third embodiment of the present invention.

The readout circuit 103*j* includes an optical signal transfer unit 103S*j* and noise signal transfer unit 103N*j*.

The optical signal transfer unit 103S*j* includes a first holding unit CTS11*j*, a second holding unit CTS12*j*, first impedance converter (first differential amplifier) 801*j*, and switches FBS1*j*, FBS2*j*, and FBS3*j*, unlike the first embodiment.

The first holding unit CTS11*j*, switch FBS1*j*, and second holding unit CTS12*j* are parallely-inserted between a switch PTS1 and the inverting input terminal of the first impedance converter 801*j*. Each of the holding units CTS11*j* and CTS12*j* holds an optical signal transferred from a pixel 101 via the switch PTS1. Each of the holding units CTS11*j* and CTS12*j* also functions as a clamp capacitance for clamping the first offset output from the first impedance converter 801*j*.

The first impedance converter 801*j* receives a reference voltage VREF at its non-inverting input terminal.

The first holding unit CTS11*j* includes electrodes CTS111*j* and CTS112*j*. For example, the electrodes CTS111*j* and CTS112*j* oppose each other to form a capacitance. The electrode (second holding electrode) CTS111*j* receives an optical signal from a pixel via a column signal line SIG. The electrode (first holding electrode) CTS112*j* receives a signal containing a first offset Vof1 from the first impedance converter 801*j*.

The second holding unit CTS12*j* includes electrodes CTS121*j* and CTS122*j*. For example, the electrodes CTS121*j* and CTS122*j* oppose each other to form a capacitance. The electrode (second holding electrode) CTS121*j* receives an optical signal from a pixel via the column signal line SIG. The electrode (first holding electrode) CTS122*j* receives a signal containing the first offset Vof1 from the first impedance converter 801*j*.

The ON/OFF states of the switches FBS1*j*, FBS2*j*, and FBS3*j* are combined to switch the path between the inverting input terminal and output terminal of the first impedance converter 801*j*. As a result, the switches FBS1*j*, FBS2*j*, and FBS3*j* switch the functions of the holding units CTS11*j* and CTS12*j*.

The noise signal transfer unit 103N*j* includes a third holding unit CTN11*j*, a fourth holding unit CTN12*j*, second impedance converter (second differential amplifier) 802*j*, and switches FBN1*j*, FBN2*j*, and FBN3*j*, unlike the first embodiment.

The third holding unit CTN11*j*, switch FBN1*j*, and fourth holding unit CTN12*j* are parallely-inserted between a switch PTN1 and the inverting input terminal of the second impedance converter 802*j*. Each of the holding units CTN11*j* and CTN12*j* holds a noise signal transferred from the pixel 101 via the switch PTN1. Each of the holding units CTN11*j* and CTN12*j* also functions as a clamp capacitance for clamping the second offset output from the second impedance converter 802*j*.

The second impedance converter 802*j* receives the reference voltage VREF at its non-inverting input terminal.

The third holding unit CTN11*j* includes electrodes CTN111*j* and CTN112*j*. For example, the electrodes CTN111*j* and CTN112*j* oppose each other to form a pacacitance. The electrode (fourth holding electrode) CTN111*j* receives an optical signal from a pixel via the column signal line SIG. The electrode (third holding electrode) CTN112*j* receives a signal containing a second offset Vof2 from the second impedance converter 802*j*.

The fourth holding unit CTN12*j* includes electrodes CTN121*j* and CTN122*j*. For example, the electrodes CTN121*j* and CTN122*j* oppose each other to form a capacitance. The electrode (fourth holding electrode) CTN121*j* receives an optical signal from a pixel via the column signal line SIG. The electrode (third holding electrode) CTN122*j* receives a signal containing the second offset Vof2 from the second impedance converter 802*j*.

The ON/OFF states of the switches FBN1*j*, FBN2*j*, and FBN3*j* are combined to switch the path between the inverting input terminal and output terminal of the second impedance converter 802*j*. As a result, the switches FBN1*j*, FBN2*j*, and FBN3*j* switch the functions of the holding units CTN11*j* and CTN12*j*.

Figure 11:
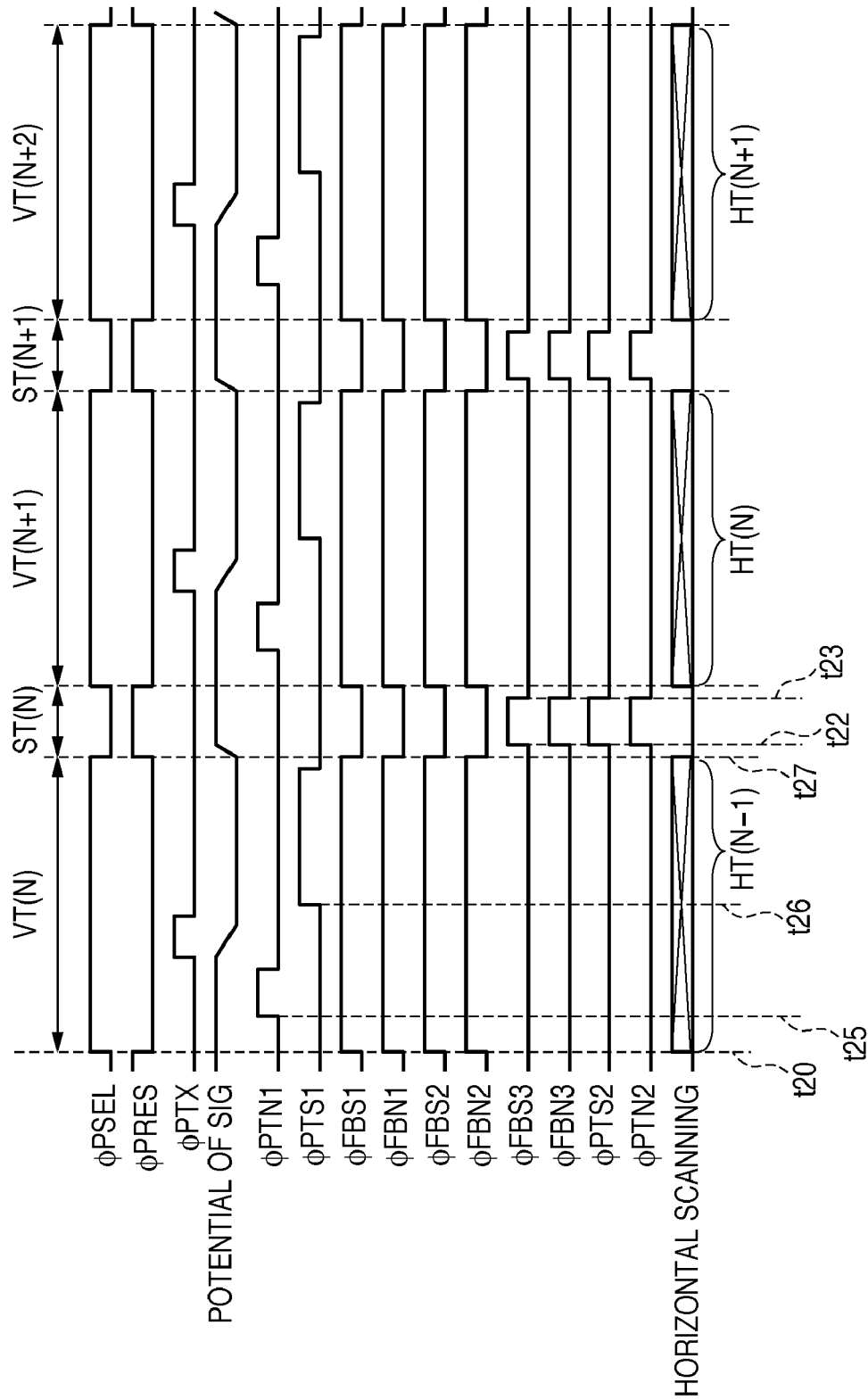
FIG. 11 is a timing chart showing the operation of the readout circuit 103$j$ on each column.

The operation of the readout circuit 103*j* on each column is different from that in the first embodiment in the following point as shown in FIG. 11. FIG. 11 is a timing chart showing the operation of the readout circuit 103*j* on each column.

At time t20 in the vertical transfer period VT(N), a vertical scanning circuit 110 supplies active-level signals φFBS1 and φFBS2 to the switches FBS1*j* and FBS2*j* of the optical signal transfer unit 103S*j* on each column. The vertical scanning circuit 110 supplies a nonactive-level signal φFBS3 to the switch FBS3*j* of the optical signal transfer unit 103S*j* on each column. In response to these signals, both the switches FBS1*j* and FBS2j are turned on, and the switch FBS3j is turned off in the optical signal transfer unit 103Sj on each column.

Similarly, the vertical scanning circuit 110 supplies active-level signals φFBN1 and φFBN2 to the switches FBN1j and FBN2j of the noise signal transfer unit 103Nj on each column. The vertical scanning circuit 110 supplies a nonactive-level signal φFBN3 to the switch FBN3j of the noise signal transfer unit 103Nj on each column. In response to these signals, both the switches FBN1j and FBN2j are turned on, and the switch FBN3j is turned off in the noise signal transfer unit 103Nj on each column.

Figure 12A:
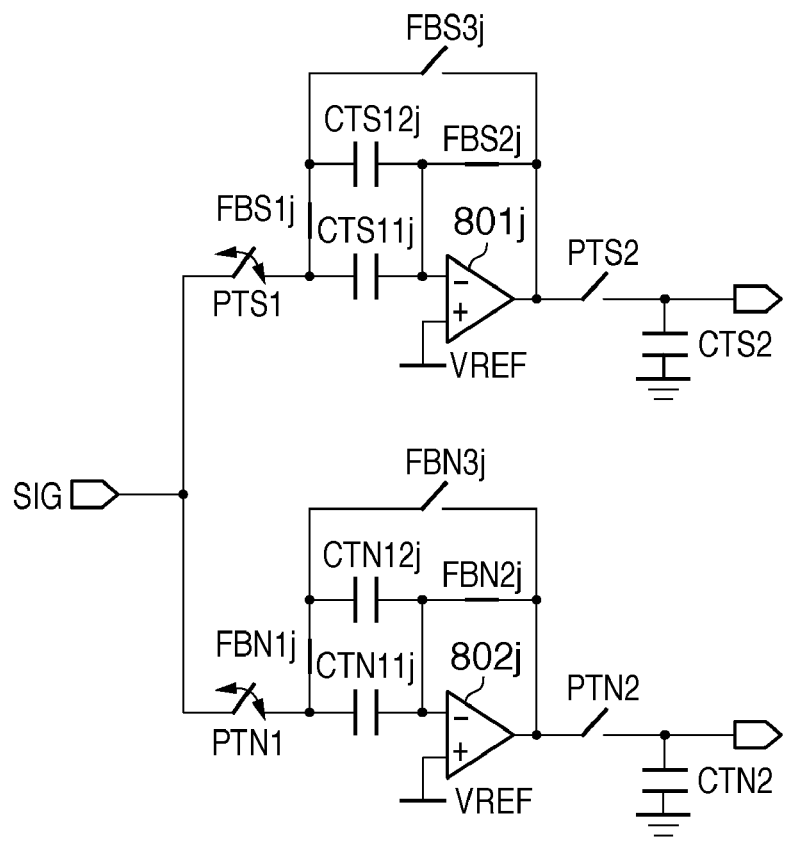
FIGS. 12A and 12B are circuit diagrams showing the connection state of an optical signal transfer unit 103Sj on each column at time t20.

More specifically, the connection state (first holding state) of the optical signal transfer unit 103Sj on each column at time t20 is as shown in FIG. 12A. In the optical signal transfer unit 103Sj on each column, the holding units CTS11j and CTS12j are parallel-connected between the switch PTS1 and the inverting input terminal of the first impedance converter 801j. The inverting input terminal and output terminal of the first impedance converter 801j are short-circuited. The electrodes CTS112j and CTS122j receive a signal (VREF+Vof1) output from the first impedance converter 801j.

The connection state (third holding state) of the noise signal transfer unit 103Nj on each column at time t20 is as shown in FIG. 12A. In the noise signal transfer unit 103Nj on each column, the electrodes CTN112j and CTN122j receive a signal (VREF+Vof2) output from the second impedance converter 802j.

Figure 12B:
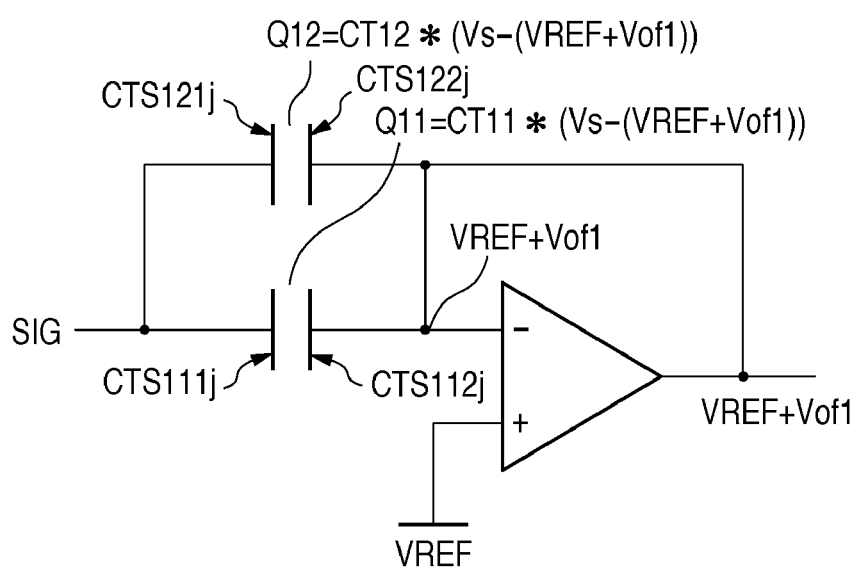

At time t26, the electrode CTS111j of the first holding unit CTS11j and the electrode CTS112j of the second holding unit CTS12j receive an optical signal Vs of each pixel on the Nth row. As shown in FIG. 12B, letting CT11 be the capacitance of the second holding unit CTS11j, the second holding unit CTS11j holds charges Q11:

$$Q11 = CT11*(Vs - (VREF + Vof1)) \quad (7)$$

Letting CT12 be the capacitance of the second holding unit CTS12j, the second holding unit CTS12j holds charges Q12:

$$Q12 = CT12*(Vs - (VREF + Vof1)) \quad (8)$$

Similarly, letting Vn be the noise signal of each pixel on the Nth row at time t25 and CT11 be the capacitance of the third holding unit CTN11j, the third holding unit CTN11j holds charges Q13:

$$Q13 = CT11*(Vn - (VREF + Vof2)) \quad (9)$$

Letting CT12 be the capacitance of the fourth holding unit CTN12j, the fourth holding unit CTN12j holds charges Q14:

$$Q14 = CT12*(Vn - (VREF + Vof2)) \quad (10)$$

At time t27 in the sampling period ST(N), the vertical scanning circuit 110 supplies nonactive-level signals φFBS1 and φFBS2 to the switches FBS1j and FBS2j of the optical signal transfer unit 103Sj on each column, thereby turning them off.

Similarly, the vertical scanning circuit 110 supplies nonactive-level signals φFBN1 and φFBN2 to the switches FBN1j and FBN2j of the noise signal transfer unit 103Nj on each column, thereby turning them off.

At time t22, the vertical scanning circuit 110 supplies an active-level signal φFBS3 to the switch FBS3j of the optical signal transfer unit 103Sj on each column, thereby turning it on.

Similarly, the vertical scanning circuit 110 supplies an active-level signal φFBN3 to the switch FBN3j of the noise signal transfer unit 103Nj on each column, thereby turning it on.

Figure 13A:
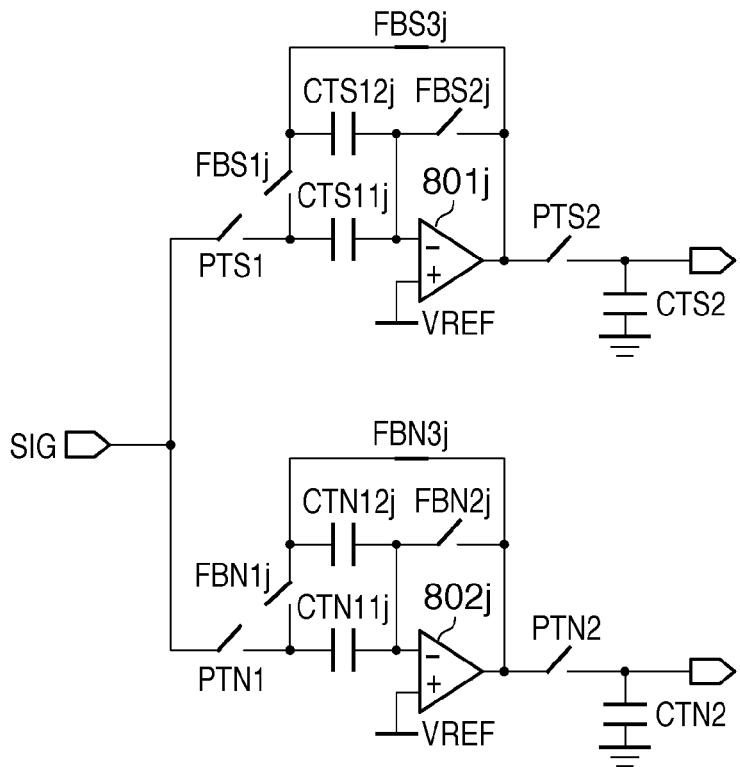
FIGS. 13A and 13B are circuit diagrams showing the connection state of the optical signal transfer unit 103Sj on each column at time t22.

More specifically, the connection state (second holding state) of the optical signal transfer unit 103Sj on each column at time t22 is as shown in FIG. 13A. In the optical signal transfer unit 103Sj on each column, the first holding unit CTS11j is series-connected between the switch PTS1 and the inverting input terminal of the first impedance converter 801j. The second holding unit CTS12j is connected between the inverting input terminal and output terminal of the first impedance converter 801j. By the clamping operation of the holding units CTS11j and CTS12j and the first impedance converter 801j, the output terminal of the first impedance converter 801j outputs an optical signal free from the first offset Vof1. That is, the output terminal of the first impedance converter 801j outputs a voltage (signal) Vo801j:

$$Vo801j = (VREF + Vof1) + (Vs - (VREF + Vof1)) = Vs \quad (11)$$

As is apparent from equation (11), VREF+Vof1 is canceled.

The connection state (fourth holding state) of the noise signal transfer unit 103Nj on each column at time t22 is with reference to FIG. 13A. Letting Vn be the noise signal of each pixel on the Nth row, the output terminal of the second impedance converter 802j in the noise signal transfer unit 103Nj outputs a voltage (signal) Vo802j:

$$Vo802j = (VREF + Vof2) + (Vn - (VREF + Vof2)) = Vn \quad (12)$$

CTS11 and CTN11 in the third embodiment can also be omitted.

An image sensing apparatus 100k according to the fourth embodiment will be described. A difference from the third embodiment will be mainly explained.

The structure of a readout circuit 103j on each column in the image sensing apparatus 100k is similar to that in the third embodiment. However, the operation of the readout circuit on each column is different from that in the third embodiment in that a gain is applied using an impedance converter, as shown in FIG. 14. FIG. 14 is a timing chart showing the operation of the readout circuit 103j on each column in the image sensing apparatus 100k according to the fourth embodiment of the present invention.

At time t30 in the vertical transfer period VT(N), a vertical scanning circuit 110 supplies an active-level control signal φPTS1 to a switch PTS1 of an optical signal transfer unit 103Sj on each column. Then, the switch PTS1 is turned on to transfer, to holding units CTS11j and CTS12j, an optical signal output from a pixel 101 to a column signal line SIG. The vertical scanning circuit 110 supplies an active-level control signal φPTN1 to a switch PTN1 of a noise signal transfer unit 103Nj on each column. In response to this, the switch PTN1 is turned on to transfer, to holding units CTN11j and CTN12j, a noise signal output from the pixel 101 to the column signal line SIG. The remaining operation is the same as that at time t20 in the third embodiment. The connection state of the readout circuit 103j at time t30 is as shown in FIG. 12A.

At time t31, the vertical scanning circuit 110 supplies nonactive-level signals φFBS1 and φFBS2 to switches FBS1j and FBS2j of the optical signal transfer unit 103Sj on each column, thereby turning them off. At this time, the switch PTS1 remains on.

Similarly, the vertical scanning circuit 110 supplies nonactive-level signals φFBN1 and φFBN2 to switches FBN1j and FBN2j of the noise signal transfer unit 103Nj on each column, thereby turning them off. At this time, the switch PTN1 remains on.

At time t32, a switch FBN3j is turned on while the switch PTN1 in the noise signal transfer unit 103Nj on each column is ON. Then, a signal obtained by applying a gain (CT11+

Figure 13B:
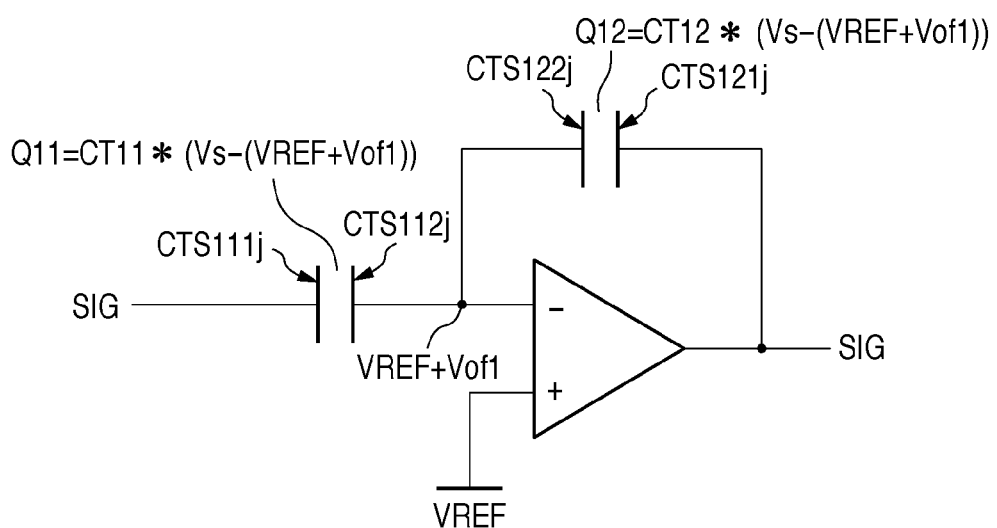

CT12)/CT11 to the noise signal output from the pixel 101 to the column signal line SIG at time t30 appears at the output terminal of a second impedance converter 802j. A switch FBS3j is turned on while the switch PTS1 in the optical signal transfer unit 103Sj on each column is ON. The remaining operation is similar to that at time t22 in the third embodiment. The connection state of the readout circuit 103j at time t32 is as shown in FIG. 13B.

At time t33, the vertical scanning circuit 110 supplies a nonactive-level control signal φPTN1 to the switch PTN1 of the noise signal transfer unit 103Nj on each column, thereby turning it off.

At time t34, the vertical scanning circuit 110 supplies an active-level control signal φPTX to a transfer unit TX of each pixel on the Nth row. In the pixel on the Nth row, the transfer unit TX transfers charges in a photoelectric conversion unit PD to a charge-voltage converter FD, and a pixel output unit SF outputs an optical signal to the column signal line SIG. The switch PTS1 in the ON state transfers, to the first holding unit CTS11j, the optical signal output from the pixel 101 to the column signal line SIG. As a result, a signal obtained by applying a gain (CTS11+CTS12)/CTS11 to the optical signal transferred to the first holding unit CTS11j appears at the output terminal of a first impedance converter 801j.

The fourth embodiment can apply a gain using the impedance converter to decrease a gain to be applied to noise generated in the second holding unit CTS2 or fourth holding unit CTN2. This can increase the total S/N ratio.

An image sensing apparatus 100n according to the fifth embodiment will be described. A difference from the third embodiment will be mainly explained.

Figure 15:
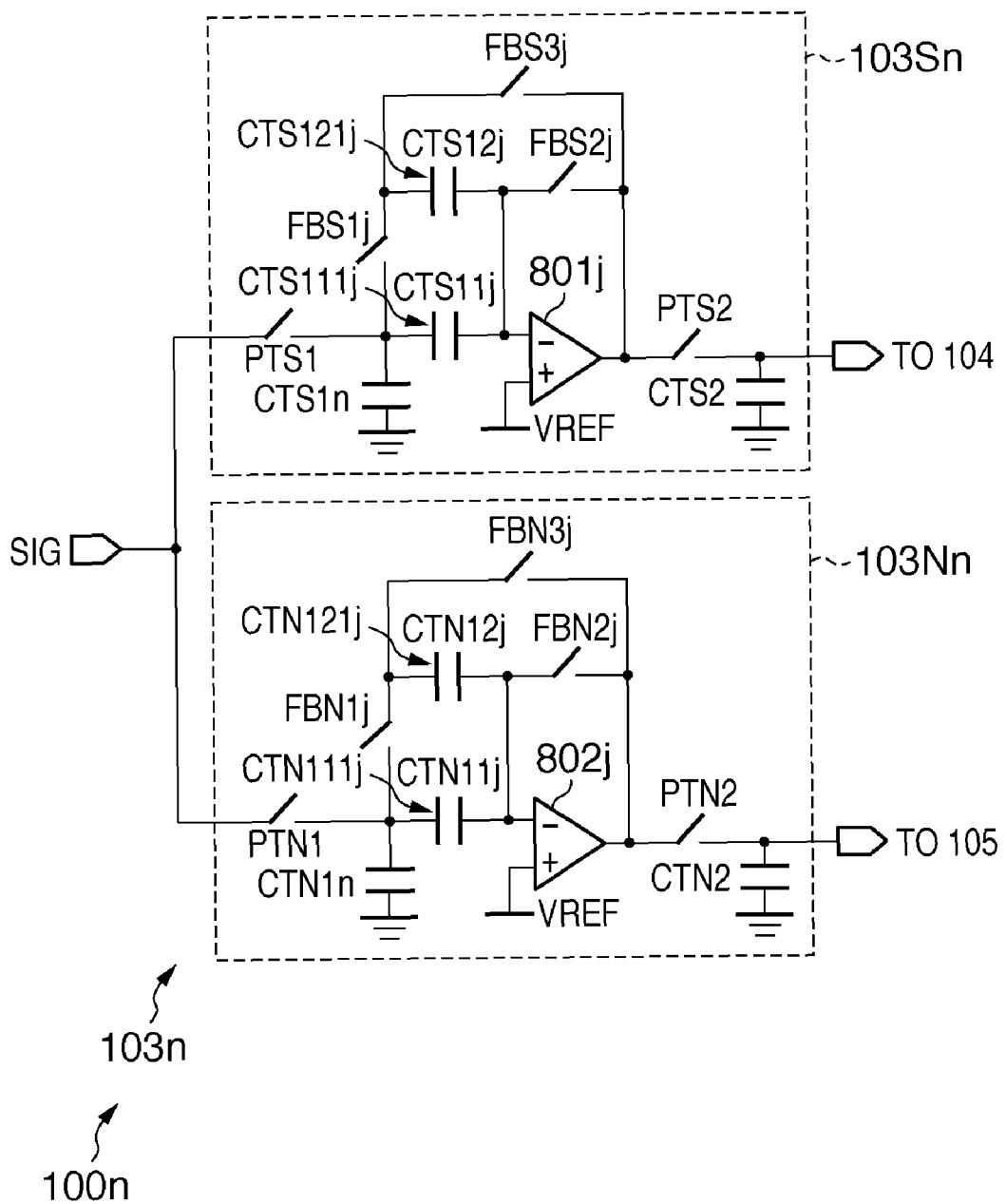
FIG. 15 is a circuit diagram showing the structure of a readout circuit 103n on each column in an image sensing apparatus 100n according to the fifth embodiment of the present invention.

The image sensing apparatus 100n is different from that in the third embodiment in the structure of a readout circuit 103n on each column, as shown in FIG. 15. FIG. 15 is a circuit diagram showing the structure of the readout circuit 103n on each column in the image sensing apparatus 100n according to the fifth embodiment of the present invention.

The readout circuit 103n includes an optical signal transfer unit 103Sn and noise signal transfer unit 103Nn.

The optical signal transfer unit 103Sn further includes a first holding unit CTS1n. The first holding unit CTS1n is connected between an electrode CTS111j of a second holding unit CTS11j and a switch PTS1. Even when the switch PTS1 is turned off to float the electrode CTS111j and an electrode CTS121j and disturbance noise or the like is mixed in the floating electrodes CTS111j and CTS121j, the first holding unit CTS1n suppresses potential fluctuations of the electrodes CTS111j and CTS121j.

Similarly, the noise signal transfer unit 103Nn further includes a third holding unit CTN1n. The third holding unit CTN1n is connected between an electrode CTN111j of a fourth holding unit CTN11j and a switch PTN1. Even when the switch PTN1 is turned off to float the electrode CTN111j and an electrode CTN121j and disturbance noise or the like is mixed in the electrodes CTN111j and CTN121j, the third holding unit CTN1n suppresses potential fluctuations of the electrodes CTN111j and CTN121j.

The operation of the readout circuit 103n on each column is similar to that in the third embodiment.

An image sensing apparatus 100p according to the sixth embodiment will be described. A difference from the third embodiment will be mainly explained.

Figure 16:
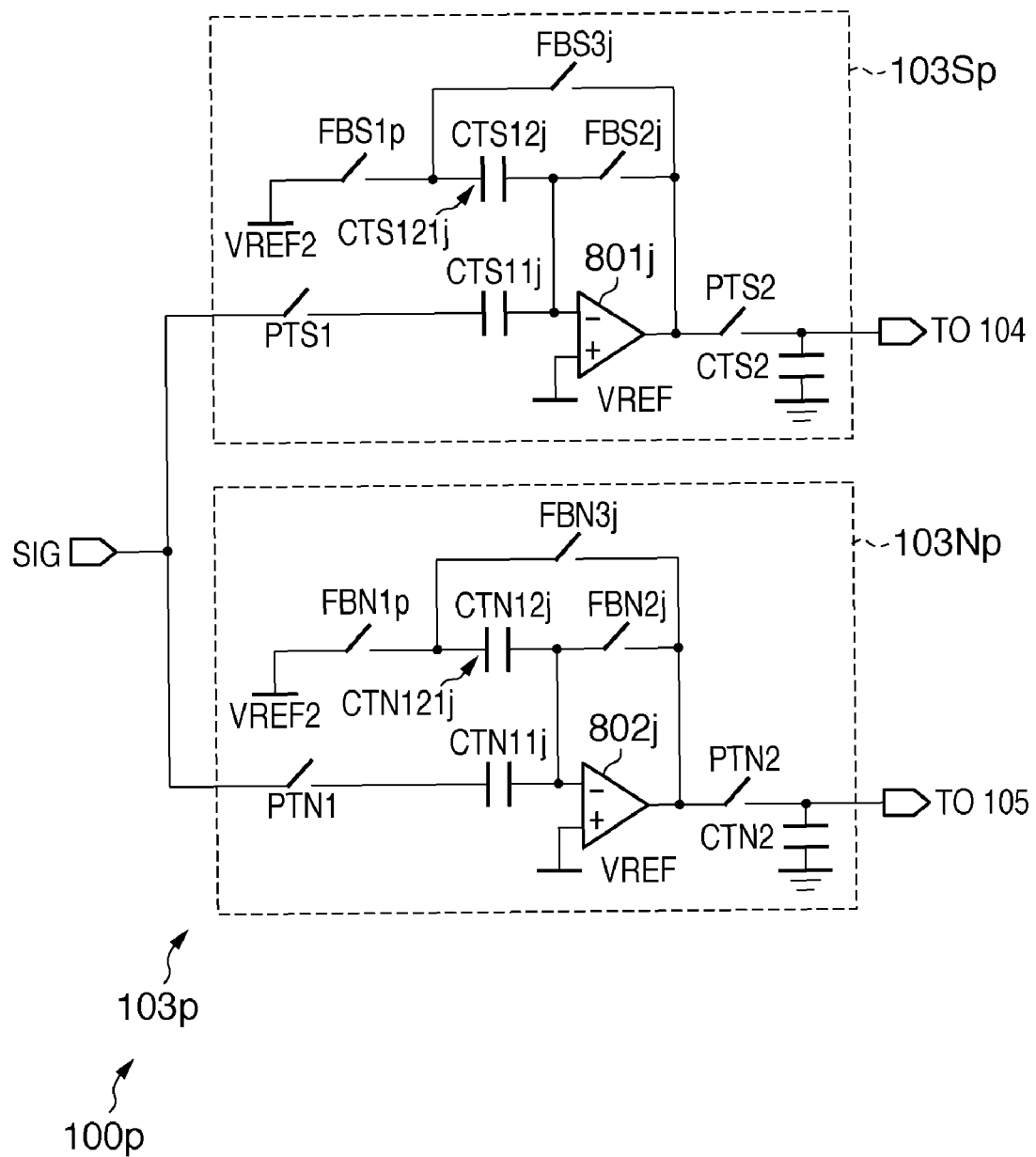
FIG. 16 is a circuit diagram showing the structure of a readout circuit 103p on each column in an image sensing apparatus 100p according to the sixth embodiment of the present invention.

The image sensing apparatus 100p is different from that in the third embodiment in the structure of a readout circuit 103p on each column, as shown in FIG. 16. FIG. 16 is a circuit diagram showing the structure of the readout circuit 103p on each column in the image sensing apparatus 100p according to the sixth embodiment of the present invention.

The readout circuit 103p includes an optical signal transfer unit 103Sp and noise signal transfer unit 103Np.

The optical signal transfer unit 103Sp includes a switch FBS1p instead of the switch FBS1j. The switch FBS1p is turned on to supply a reference voltage VREF2 to an electrode CTS121j of a first holding unit CTS12j.

The noise signal transfer unit 103Np includes a switch FBN1p instead of the switch FBN1j. The switch FBN1p is turned on to supply the reference voltage VREF2 to an electrode CTN121j of a third holding unit CTN12j.

The operation of the readout circuit 103p on each column is different from that in the third embodiment in the following point as shown in FIG. 14.

During an interval between time t30 and time t31 in the vertical transfer period VT(N), a vertical scanning circuit 110 supplies an active-level control signal φFBS1 to the switch FBS1p of the optical signal transfer unit 103Sp on each column. Then, the switch FBS1p is turned on to supply a reference voltage VREF2 to the electrode CTS121j of the first holding unit CTS12j. The first holding unit CTS12j holds charges Q12p:

$$Q12p = CT12 * (VREF2 - (VREF + Vof1)) \tag{13}$$

During the interval between time t30 and time t31, the vertical scanning circuit 110 supplies an active-level control signal φFBN1 to the switch FBN1p of the noise signal transfer unit 103Np on each column. Then, the switch FBN1p is turned on to supply the reference voltage VREF2 to the electrode CTN121j of the third holding unit CTN12j. The third holding unit CTN12j holds charges Q14p:

$$Q14p = CT12 * (VREF2 - (VREF + Vof2)) \tag{14}$$

At time t32, a switch FBS3j is turned on while the switch PTS1 in the optical signal transfer unit 103Sp on each column is ON. In response to this, the first holding unit CTS12j is connected between the output terminal and inverting input terminal of a first impedance converter 801j, and the signal VREF2 appears at the output terminal.

Similarly, the signal VREF2 appears at the output terminal of a second impedance converter 802j in the noise signal transfer unit 103Np on each column.

During an interval between time t32 and time t33, a signal obtained by applying a gain (CT11+CT12)/CT11 to a change ΔVn of an input from a pixel to the noise signal transfer unit 103Np appears at the output terminal of the second impedance converter 802j. That is, a signal given by $$VREF2 + \Delta Vn * (CT11 + CT12)/CT11 \tag{15}$$

appears at the output terminal of the second impedance converter 802j.

During an interval between time t34 and time t35, a signal obtained by applying a gain (CT11+CT12)/CT11 to the change ΔVs of an input from a pixel to the optical signal transfer unit 103Sp appears at the output terminal of the first impedance converter 801j. That is, a signal given by $$VREF2 + \Delta Vs * (CT11 + CT12)/CT11 \tag{16}$$

appears at the output terminal of the first impedance converter 801j.

As described above, in addition to the effects of the fourth embodiment, the sixth embodiment can adjust the DC level of a signal by adjusting VREF2. Therefore, the dynamic range can be used effectively during the horizontal transfer period.

An image sensing apparatus 100q according to the seventh embodiment will be described. A difference from the fifth embodiment will be mainly explained.

Figure 17:
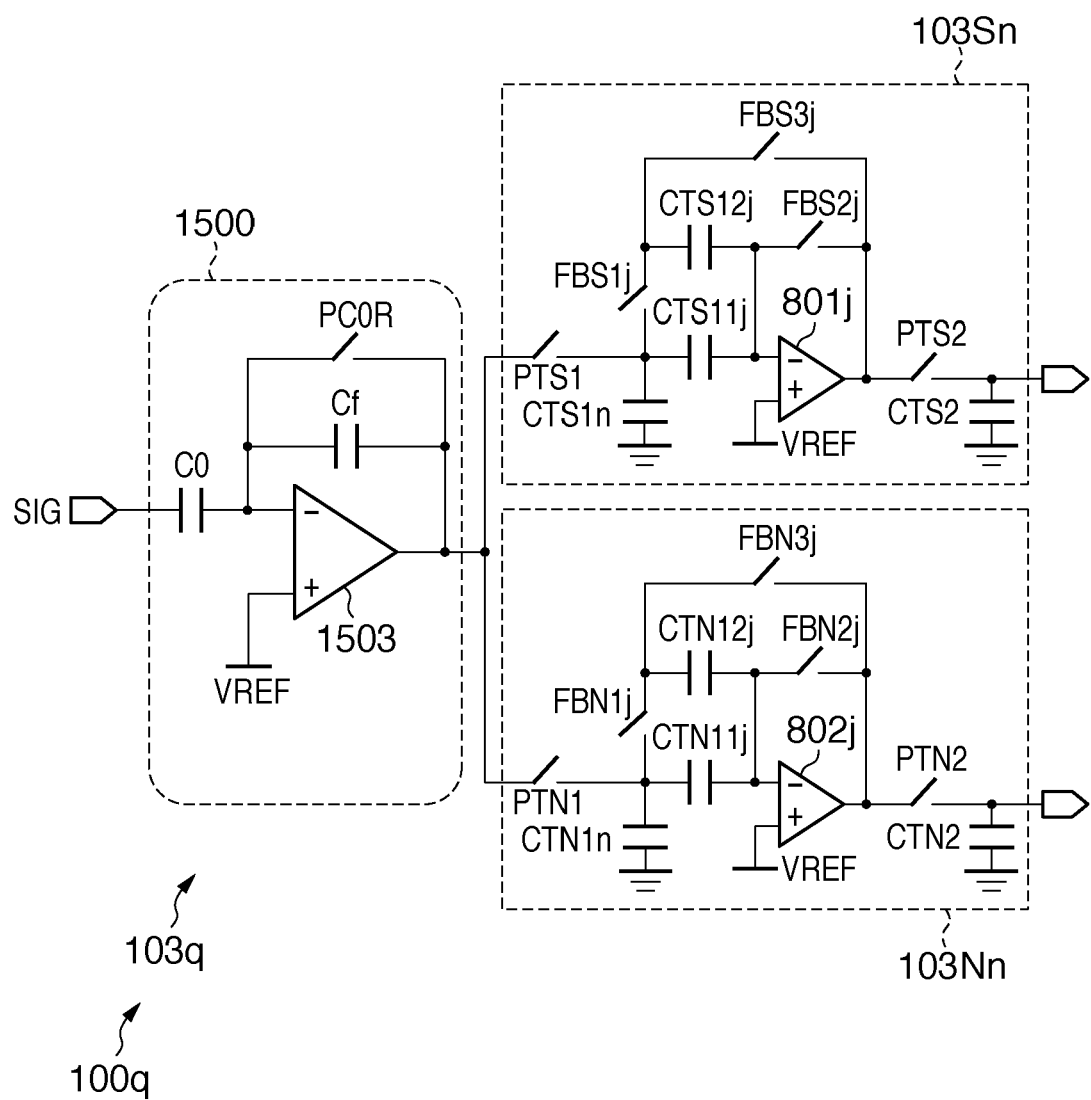
FIG. 17 is a circuit diagram showing the structure of a readout circuit 103q on each column in an image sensing apparatus 100q according to the seventh embodiment of the present invention.

The image sensing apparatus 100q is different from that in the third embodiment in the structure of a readout circuit 103q on each column, as shown in FIG. 17. FIG. 17 is a circuit diagram showing the structure of the readout circuit 103q on each column in the image sensing apparatus 100q according to the seventh embodiment of the present invention.

The readout circuit 103q further includes a column amplifier 1500. The column amplifier 1500 is arranged on the preceding stage of an optical signal transfer unit 103Sn and noise signal transfer unit 103Nn.

The column amplifier 1500 includes an impedance converter (amplifier) 1503, clamp capacitance C0, feedback capacitance Cf, and reset switch PC0R.

The impedance converter (amplifier) 1503 receives a reference voltage VREF at its non-inverting input terminal, and its inverting input terminal is connected to a column signal line SIG via the clamp capacitance C0. The feedback capacitance Cf and reset switch PC0R are parallel-connected between the output terminal and inverting input terminal of the impedance converter 1503.

The impedance converter 1503 amplifies an optical signal output to the column signal line SIG, and supplies the amplified optical signal to the optical signal transfer unit 103Sn. Also, the impedance converter 1503 amplifies a noise signal output to the column signal line SIG, and supplies the amplified noise signal to the noise signal transfer unit 103Nn.

Figure 18:
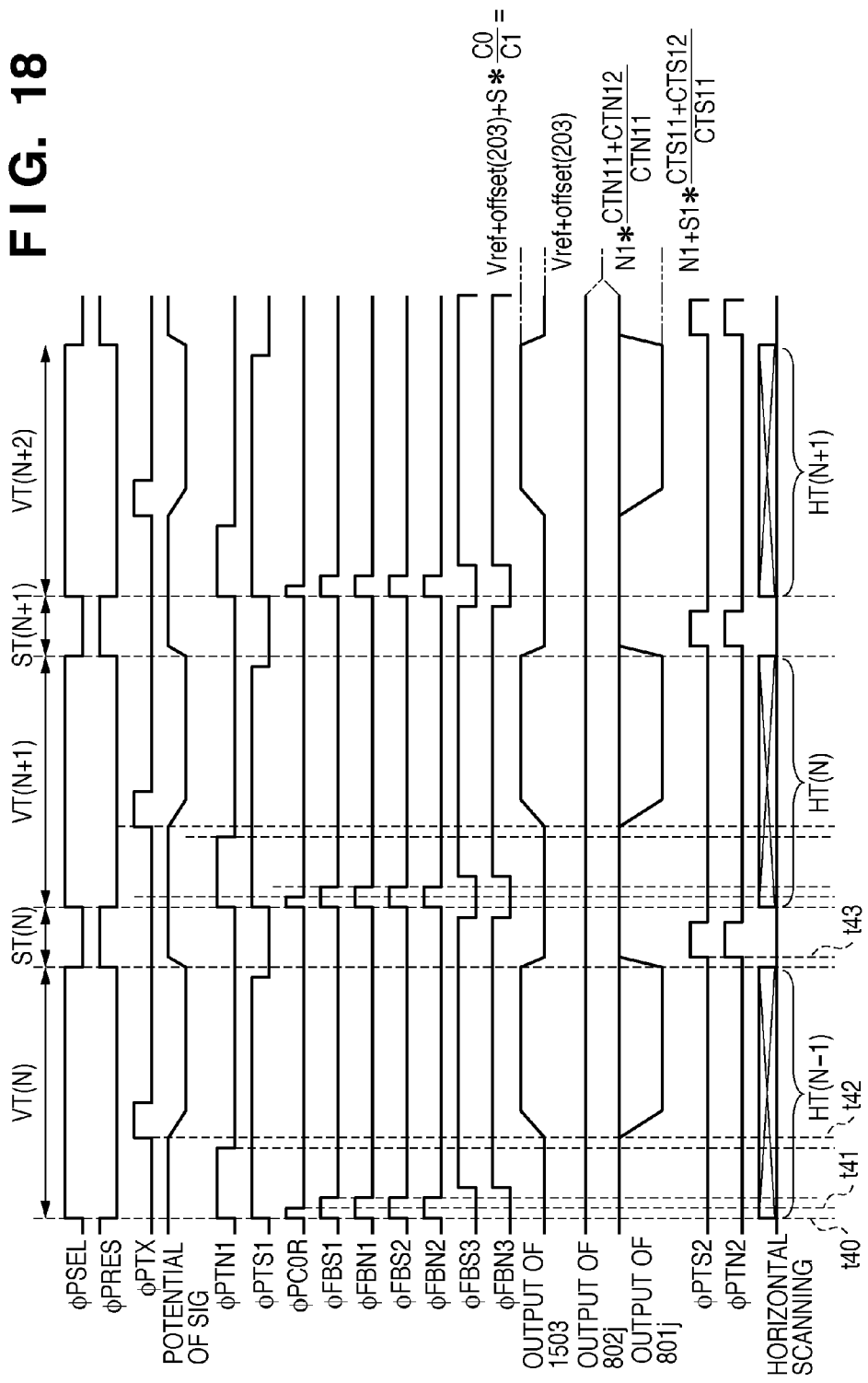
FIG. 18 is a timing chart showing the operation of a readout circuit 103q on each column.

The operation of the readout circuit 103q on each column is different from that in the fifth embodiment in the following point as shown in FIG. 18. FIG. 18 is a timing chart showing the operation of the readout circuit 103q on each column.

At time t40 in the vertical transfer period VT(N), a vertical scanning circuit 110 supplies an active-level control signal φPC0R to the reset switch PC0R in the column amplifier 1500 on each column. In response to this, the reset switch PC0R is turned on to reset the impedance converter 1503. The clamp capacitance C0 receives a noise signal output from a pixel to the column signal line SIG.

At time t41, the vertical scanning circuit 110 supplies a nonactive-level control signal φPC0R to the reset switch PC0R in the column amplifier 1500 on each column. The reset switch PC0R is turned off to hold the noise signal in the clamp capacitance C0. As a result, a signal N1:

$$N1 = VREF + Vof11 \quad (17)$$

where Vof11 is the offset of the impedance converter 1503 appears at the output terminal of the impedance converter 1503.

At time t42, the clamp capacitance C0 receives an optical signal output from the pixel to the column signal line SIG. By the clamping operation of the clamp capacitance C0 and impedance converter 1503, a signal obtained by applying a gain C0/Cf to the difference between the noise signal Vn and the optical signal Vs is output. That is, a signal S1:

$$S1 = VREF + Vof11 + (Vs - Vn) * (C0/Cf) \quad (18)$$

appears at the output terminal of the impedance converter 1503.

At time t43 in the sampling period ST(N), a second holding unit CTS2 holds a voltage (signal):

$$S1 * (CT11 + CT12)/CT11 \quad (19)$$

A fourth holding unit CTN2 holds a voltage (signal):

$$N1 * (CT11 + CT12)/CT11 \quad (20)$$

The column amplifier 1500 including the impedance converter 1503 has a function of removing noise of a pixel and applying the gain C0/Cf to an output signal, but cannot remove the output offset Vof11 of the converter itself. Hence, the optical signal transfer unit 103Sn and noise signal transfer unit 103Nn on the subsequent stage sample the offset Vof11, and apply gains to signals to output the resultant signals to an output amplifier 108. The output amplifier 108 calculates the difference between the signal given by expression (19) and that given by expression (20), generating an image signal which does not contain the output offset Vof11 of the impedance converter 1503.

The seventh embodiment can apply a gain at a portion closer to a pixel on the path extending from the pixel to the output amplifier. This can reduce the adverse effect of noise mixed while a signal passes through the path, increasing the S/N ratio.

An image sensing apparatus 100h according to the eighth embodiment will be described. A difference from the first embodiment will be mainly explained.

Figure 19:
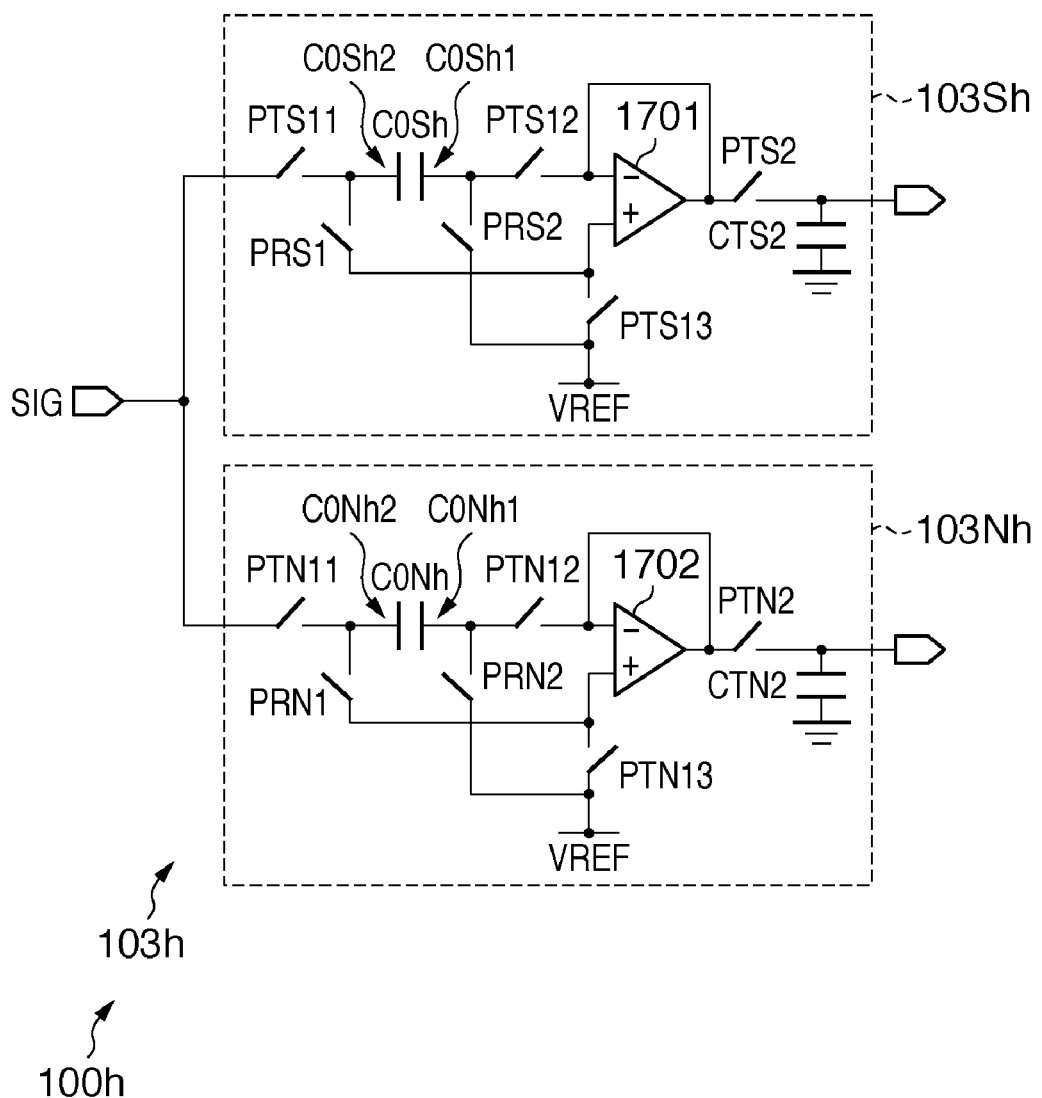
FIG. 19 is a circuit diagram showing the structure of a readout circuit 103h on each column in an image sensing apparatus 100h according to the eighth embodiment of the present invention.

The image sensing apparatus 100h is different from that in the third embodiment in the structure of a readout circuit 103h on each column, as shown in FIG. 19. FIG. 19 is a circuit diagram showing the structure of the readout circuit 103h on each column in the image sensing apparatus 100h according to the eighth embodiment of the present invention.

The readout circuit 103h includes an optical signal transfer unit 103Sh and noise signal transfer unit 103Nh.

The optical signal transfer unit 103Sh includes a first impedance converter (first differential amplifier) 1701, switch PRS1, switch PTS13, switch PTS2, switch PRS2, first holding unit C0Sh, switch PTS11, and switch PTS12.

The non-inverting input terminal of the first impedance converter 1701 is connected to the two switches PRS1 and PTS13. The two switches PRS1 and PTS13 can be exclusively turned on/off to switch the connection destination of the non-inverting input terminal between a column signal line SIG and the power supply of a reference voltage VREF.

The switch PRS1 and the switch PRS2 which is driven by the same pulse as that of the switch PRS1 switch the first holding unit C0Sh to be series- or parallel-connected to a line connecting the first impedance converter 1701 and switch PTS11.

The first holding unit C0Sh includes a first holding electrode C0Sh1 and second holding electrode C0Sh2. The first holding electrode C0Sh1 receives a signal containing a first offset Vof1 from the first impedance converter 1701. The second holding electrode C0Sh2 receives an optical signal Vs from a pixel via the column signal line SIG.

The switch PTS11 connects/disconnects the column signal line SIG to/from the first holding unit C0Sh.

The switch PTS12 also switches the path between the vertical transfer period VT and the sampling period ST.

The noise signal transfer unit 103Nh includes a second impedance converter (second differential amplifier) 1702, switch PRN1, switch PTN13, switch PTN2, switch PRN2, third holding unit C0Nh, switch PTN11, and switch PTN12.

The non-inverting input terminal of the second impedance converter 1702 is connected to the two switches PRN1 and PTN13. The two switches PRN1 and PTN13 can be exclusively turned on/off to switch the connection destination between the column signal line SIG and the power supply of the reference voltage VREF.

The switch PRN1 and the switch PRN2 which is driven by the same pulse as that of the switch PRN1 switch the third holding unit C0Nh to be series- or parallel-connected to a line connecting the second impedance converter 1702 and switch PTN11.

The third holding unit C0Nh includes a third holding electrode C0Nh1 and fourth holding electrode C0Nh2. The third holding electrode C0Nh1 receives a signal containing a second offset Vof2 from the second impedance converter 1702. The fourth holding electrode C0Nh2 receives an noise signal Vn from a pixel via the column signal line.

The switch PTN11 connects/disconnects the column signal line SIG to/from the third holding unit C0Nh.

The switch PTN12 also switches the path between the vertical transfer period VT and the sampling period ST.

Figure 20:
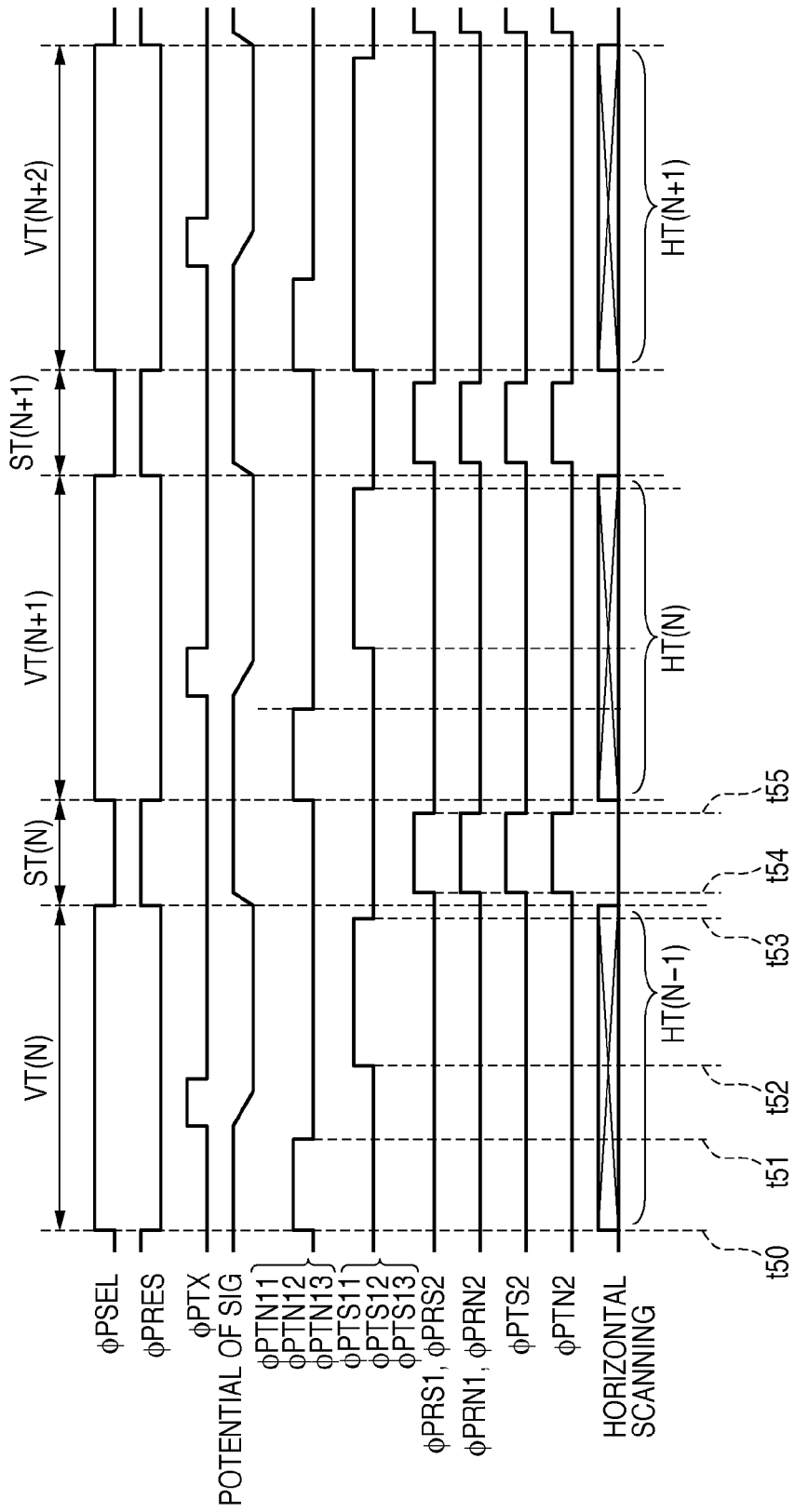
FIG. 20 is a timing chart showing the operation of a readout circuit 103h on each column.

The operation of the readout circuit 103h on each column is different from that in the first embodiment in the following point as shown in FIG. 20. FIG. 20 is a timing chart showing the operation of the readout circuit 103h on each column.

Figure 21:
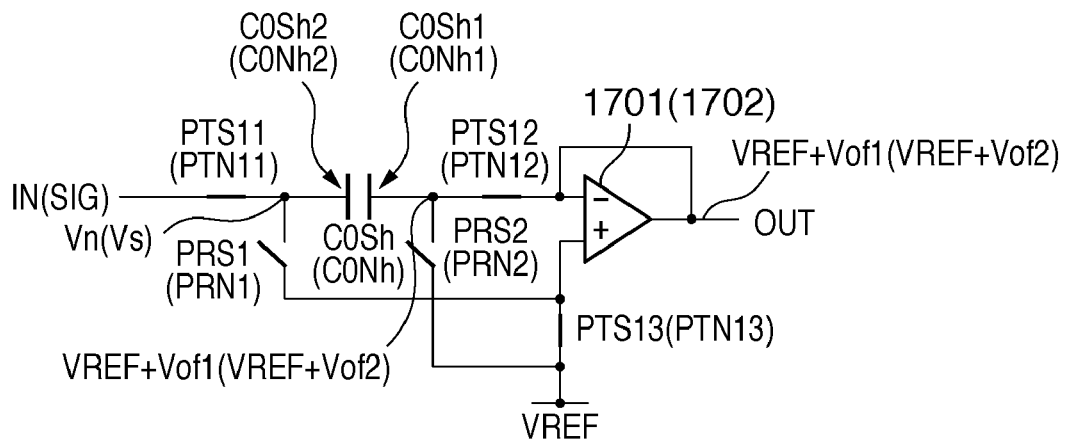
FIG. 21 is a circuit diagram showing the connection state of a noise signal transfer unit 103Nh at time t50 or that of an optical signal transfer unit 103Sh at time t52.

At time t50 in the vertical transfer period VT(N), a vertical scanning circuit 110 supplies active-level control signals φPTN11, φPTN12, and φPTN13 respectively to the switches PTN11, PTN12, and PTN13 of the noise signal transfer unit 103Nh on each column, thereby turning them on. The connection state (third holding state) of the noise signal transfer unit 103Nh is as shown in FIG. 21. At this time, the non-inverting input terminal of the second impedance converter 1702 receives the reference voltage VREF. The inverting input terminal of the second impedance converter 1702 is connected to the third holding electrode C0Nh1 of the third holding unit C0Nh. The third holding electrode C0Nh1 of the third holding unit C0Nh receives a signal (VREF+Vof2). The fourth holding electrode C0Nh2 of the third holding unit C0Nh receives the noise signal Vn output from a pixel to the column signal line SIG.

At time t51, the vertical scanning circuit 110 supplies non-active-level control signals φPTN11, φPTN12, and φPTN13 respectively to the switches PTN11, PTN12, and PTN13 of the noise signal transfer unit 103Nh on each column, thereby turning them off. The third holding unit C0Nh holds the noise signal.

At time t52, the vertical scanning circuit 110 supplies active-level control signals φPTS11, φPTS12, and φPTS13 respectively to the switches PTS11, PTS12, and PTS13 of the optical signal transfer unit 103Sh on each column, thereby turning them on. The connection state (first holding state) of the optical signal transfer unit 103Sh is as shown in FIG. 21. At this time, the non-inverting input terminal of the first impedance converter 1701 receives the reference voltage VREF. The inverting input terminal of the first impedance converter 1701 is connected to the first holding electrode C0Sh1 of the first holding unit C0Sh. The first holding electrode C0Sh1 of the first holding unit C0Sh receives a signal (VREF+Vof1). The second holding electrode C0Sh2 of the first holding unit C0Sh receives the optical signal Vs output from the pixel to the column signal line SIG.

At time t53, the vertical scanning circuit 110 supplies non-active-level control signals φPTS11, φPTS12, and φPTS13 respectively to the switches PTS11, PTS12, and PTS13 of the optical signal transfer unit 103Sh on each column, thereby turning them off. The first holding unit C0Sh holds the optical signal.

Figure 22:
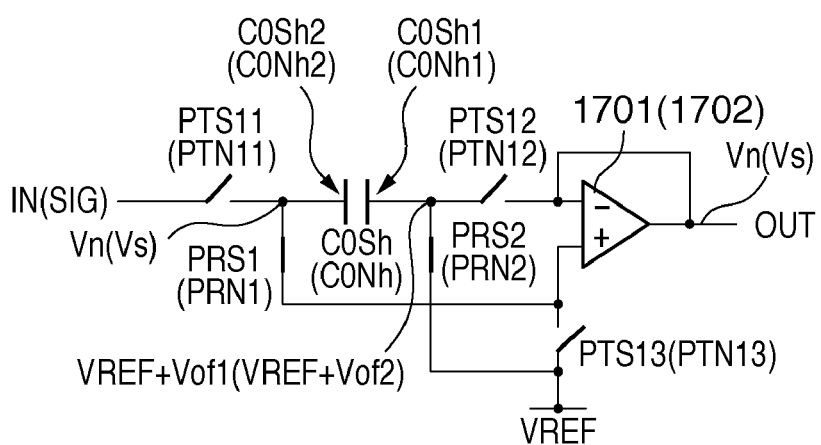
FIG. 22 is a circuit diagram showing the connection state of the noise signal transfer unit 103Nh at time t54 or that of the optical signal transfer unit 103Sh at time t54.

At time t54 in the sampling period ST(N), the vertical scanning circuit 110 supplies active-level control signals φPRS1 and φPRS2 respectively to the switches PRS1 and PRS2 of the optical signal transfer unit 103Sh on each column, thereby turning them on. The connection state (fifth holding state) of the optical signal transfer unit 103Sh is as shown in FIG. 22. At this time, the non-inverting input terminal of the first impedance converter 1701 is connected to the second holding electrode C0Sh2 of the first holding unit C0Sh. The inverting input terminal of the first impedance converter 1701 is disconnected from the first holding electrode C0Sh1 of the first holding unit C0Sh. The non-inverting input terminal of the first impedance converter 1701 has a potential:

$$VREF-(VREF+Vof1-Vs) \qquad (21)$$

Thus, a signal given by $$(VREF-(VREF+Vof1-Vs))+Vof1=Vs \qquad (22)$$

appears at the output terminal of the first impedance converter 1701 (see FIG. 26).

At time t54, the connection state (sixth holding state) of the noise signal transfer unit 103Nh is as shown in FIG. 22. At this time, the non-inverting input terminal of the second impedance converter 1702 is connected to the fourth holding electrode C0Nh2 of the third holding unit C0Nh. The inverting input terminal of the second impedance converter 1702 is disconnected from the third holding electrode C0Nh1 of the third holding unit C0Nh. A signal given by $$(VREF-(VREF+Vof2-Vn))+Vof2=Vn \qquad (23)$$

appears at the output terminal of the second impedance converter 1702 in the noise signal transfer unit 103Nh (see FIG. 26).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-177408, filed Jul. 7, 2008, which is hereby incorporated by reference herein in its entirety.

What is claimed is:

1. An image sensing apparatus comprising:
   a plurality of pixels each including a photoelectric conversion unit;
   a signal line connected to the plurality of pixels;
   an output unit; and
   a transfer block which transfers, to the output unit, a first signal and a second signal that are output from a readout pixel to the signal line at different timings of a period in which the readout pixel is being selected among the plurality of pixels,
   wherein the transfer block includes a first transfer unit and a second transfer unit,
   the first transfer unit includes a first impedance converter which transfers the first signal to the output unit,
   the first transfer unit transfers, as a third signal, a difference signal between a first offset of the first impedance converter and a signal obtained by superimposing the first offset on the first signal to the output unit,
   the second transfer unit includes a second impedance converter which transfers the second signal to the output unit,
   the second transfer unit transfers, as a fourth signal, a difference signal between a second offset of the second impedance converter and a signal obtained by superimposing the second offset on the second signal to the output unit, and
   the output unit generates and outputs an image signal indicative of a difference between the third signal and the fourth signal.

2. The apparatus according to claim 1, wherein the first transfer unit further includes
   a first clamp capacitance having a first electrode which receives a signal containing the first offset from the first impedance converter, and a second electrode, and a first switch which supplies a reference voltage to the second electrode, and the second transfer unit further includes a second clamp capacitance having a third electrode, which receives a signal containing the second offset from the second impedance converter, and a fourth electrode, and a second switch which supplies the reference voltage to the fourth electrode.

3. The apparatus according to claim 2, wherein the first impedance converter includes a first differential amplifier, the second impedance converter includes a second differential amplifier, the first transfer unit switches between a first state and a second state, the first state being a state where an output terminal of the first differential amplifier, the first electrode, and an inverting input terminal of the first differential amplifier are connected to each other and the reference voltage is supplied to the second electrode, and the second state being a state where the output terminal of the first differential amplifier and the first electrode are disconnected from each other and the second electrode is connected to a non-inverting input terminal of the first differential amplifier without supplying the reference voltage to the second electrode while maintaining the connection between the output terminal of the first differential amplifier and the inverting input terminal of the first differential amplifier, and the second transfer unit switches between a third state and a fourth state, the third state being a state where an output terminal of the second differential amplifier, the third electrode, and an inverting input terminal of the second differential amplifier are connected to each other and the reference voltage is supplied to the fourth electrode, and the fourth state being a state where the output terminal of the second differential amplifier and the third electrode are disconnected from each other and the fourth electrode is connected to a non-inverting input terminal of the second differential amplifier without supplying the reference voltage to the fourth electrode while maintaining the connection between the output terminal of the second differential amplifier and the inverting input terminal of the second differential amplifier.

4. The apparatus according to claim 2, wherein the first impedance converter includes a first differential amplifier, the second impedance converter includes a second differential amplifier, the first transfer unit switches between a fifth state and a sixth state, the fifth state being a state where an output terminal of the first differential amplifier and the first electrode are connected to each other and the reference voltage is supplied to the second electrode, and the sixth state being a state where the reference voltage is not supplied to the second electrode while maintaining the connection between the output terminal of the first differential amplifier and the first electrode, and the second transfer unit switches between a seventh state and an eighth state, the seventh state being a state where an output terminal of the second differential amplifier and the third electrode are connected to each other and the reference voltage is supplied to the fourth electrode, and the eighth state being a state where the reference voltage is not supplied to the fourth electrode while maintaining the connection between the output terminal of the second differential amplifier and the third electrode.

5. The apparatus according to claim 1, wherein the first transfer unit further includes a first holding unit which holds the first signal, and a second holding unit which holds the first signal transferred from the first holding unit via the first impedance converter, the second transfer unit further includes a third holding unit which holds the second signal, and a fourth holding unit which holds the second signal transferred from the third holding unit via the second impedance converter, the first holding unit includes a first holding electrode which receives a signal containing the first offset from the first impedance converter and a second holding electrode which receives the first signal from the readout pixel via the signal line, the third holding unit includes a third holding electrode which receives a signal containing the second offset from the second impedance converter and a fourth holding electrode which receives the second signal from the readout pixel via the signal line, the first impedance converter includes a first differential amplifier, the second impedance converter includes a second differential amplifier, the first transfer unit switches between a first holding state and a second holding state, the first holding state being a state where an inverting input terminal of the first differential amplifier, an output terminal of the first differential amplifier, and the first holding electrode are connected to each other and the signal line and the second holding electrode are connected to each other, and the second holding state being a state where the output terminal of the first differential amplifier and the first holding electrode are disconnected from each other, the signal line and the second holding electrode are disconnected from each other, and the output terminal of the first differential amplifier and the second holding electrode are connected to each other while maintaining the connection between the inverting input terminal of the first differential amplifier and the first holding electrode, and the second transfer unit switches between a third holding state and a fourth holding state, the third holding state being a state where an inverting input terminal of the second differential amplifier, an output terminal of the second differential amplifier, and the third holding electrode are connected to each other and the signal line and the fourth holding electrode are connected to each other, and the fourth holding state being a state where the output terminal of the second differential amplifier and the third holding electrode are disconnected from each other, the signal line and the fourth holding electrode are disconnected from each other, and the output terminal of the second differential amplifier and the fourth holding electrode are connected to each other while maintaining the connection between the inverting input terminal of the second differential amplifier and the third holding electrode.

6. The apparatus according to claim 5, wherein the signal line is connected to the first differential amplifier only via the first holding unit, and the signal line is connected to the second differential amplifier only via the second holding unit.

7. The apparatus according to claim 1, wherein
the first transfer unit further includes
- a first holding unit which holds the first signal, and
- a second holding unit which holds the first signal transferred from the first holding unit via the first impedance converter, the second transfer unit further includes
- a third holding unit which holds the second signal, and
- a fourth holding unit which holds the second signal transferred from the third holding unit via the second impedance converter, the first holding unit includes a first holding electrode which receives a signal containing the first offset from the first impedance converter and a second holding electrode which receives the first signal from the readout pixel via the signal line, the third holding unit includes a third holding electrode which receives a signal containing the second offset from the second impedance converter and a fourth holding electrode which receives the second signal from the readout pixel via the signal line, the first impedance converter includes a first differential amplifier, the second impedance converter includes a second differential amplifier, the first transfer unit switches between a first holding state and a fifth holding state, the first holding state being a state where an inverting input terminal of the first differential amplifier, an output terminal of the first differential amplifier, and the first holding electrode are connected to each other and the signal line and the second holding electrode are connected to each other, and the fifth holding state being a state where the inverting input terminal and output terminal of the first differential amplifier and the first holding electrode are disconnected from each other to supply a reference voltage to the first holding electrode, the signal line and the second holding electrode are disconnected from each other, and a non-inverting input terminal of the first differential amplifier and the second holding electrode are connected to each other while maintaining the connection between the output terminal of the first differential amplifier and the inverting input terminal of the first differential amplifier, and the second transfer unit switches between a third holding state and a sixth holding state, the third holding state being a state where an inverting input terminal of the second differential amplifier, an output terminal of the second differential amplifier, and the third holding electrode are connected to each other and the signal line and the fourth holding electrode are connected to each other, and the sixth holding state being a state where the inverting input terminal and output terminal of the second differential amplifier and the third holding electrode are disconnected from each other to supply the reference voltage to the third holding electrode, the signal line and the fourth holding electrode are disconnected from each other, and a non-inverting input terminal of the second differential amplifier and the fourth holding electrode are connected to each other while maintaining the connection between the output terminal of the second differential amplifier and the inverting input terminal of the second differential amplifier.

8. The apparatus according to claim 1, wherein
the transfer block further includes an amplifier which amplifies the first signal output to the signal line to supply the amplified first signal to the first transfer unit, and amplifies the second signal output to the signal line to supply the amplified second signal to the second transfer unit.

9. An imaging system comprising:
the image sensing apparatus defined in claim 1;
an optical system which forms an image on an image sensing surface of the image sensing apparatus; and
a signal processing unit which processes a signal output from the image sensing apparatus to generate image data.

* * * * *